(12) United States Patent
Chan et al.

(10) Patent No.: US 7,110,608 B2
(45) Date of Patent: Sep. 19, 2006

(54) DIGITAL IMAGE COMPRESSION

(75) Inventors: Woei Chan, Darlinghurst (AU); James Philip Andrew, Waverton (AU); Andrew James Dorrell, East Blaxland (AU)

(73) Assignee: Canon Kabushiki Kaisha, Tokyo (JP)

( * ) Notice: Subject to any disclaimer, the term of this patent is extended or adjusted under 35 U.S.C. 154(b) by 531 days.

(21) Appl. No.: 10/184,938

(22) Filed: Jul. 1, 2002

(65) Prior Publication Data

US 2003/0113027 A1 Jun. 19, 2003

(30) Foreign Application Priority Data

Jul. 2, 2001 (AU) .................. PR6066
Jul. 2, 2001 (AU) .................. PR6067

(51) Int. Cl.
*G06K 9/36* (2006.01)

(52) U.S. Cl. .................. 382/239; 382/232; 382/233; 382/240

(58) Field of Classification Search ........ 382/232–233, 382/235, 239, 240; 358/1.2, 1.15; 375/240.25, 375/240.26

See application file for complete search history.

(56) References Cited

U.S. PATENT DOCUMENTS

| 6,246,798 B1 | 6/2001 | Andrew et al. ............. 382/240 |
| 6,259,819 B1 | 7/2001 | Andrew et al. ............. 382/248 |
| 6,263,110 B1 | 7/2001 | Andrew et al. ............. 382/232 |
| 6,266,414 B1 | 7/2001 | Bradley et al. ............. 380/240 |
| 6,351,568 B1 | 2/2002 | Andrew ...................... 382/239 |
| 6,389,074 B1 | 5/2002 | Andrew ................. 375/240.05 |

*Primary Examiner*—Duy M. Dang
(74) *Attorney, Agent, or Firm*—Fitzpatrick, Cella, Harper & Scinto

(57) ABSTRACT

A method of reconstructing an image, where the input image data is preferably part I or part II compliant JPEG2000 coded data, or pixel data of the original image. The method selects (810) an output resolution R, and then determines a number of sub-passes to extract from each block code based on the selected resolution. The method then extracts (830) the determined sub-passes and the remaining sub-passes are discarded. The method then reconstructs 840 the image from the extracted sub-passes. The reconstructed image can be in the form of the selected resolution of the original image, or it can be in the form of compressed image data of the selected resolution of the original image.

55 Claims, 22 Drawing Sheets

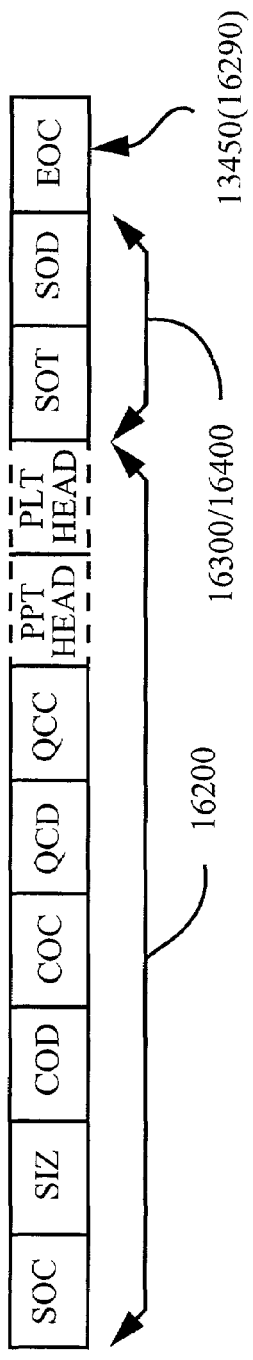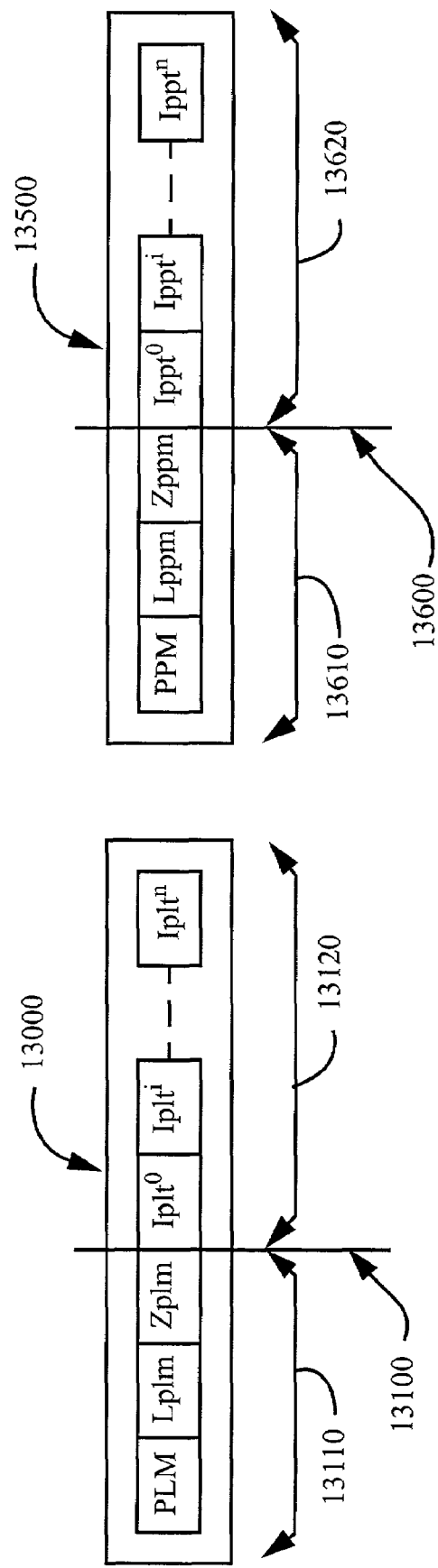
Fig. 13A
Fig. 13B
Fig. 13C

DIGITAL IMAGE COMPRESSION

TECHNICAL FIELD OF THE INVENTION

The present invention relates generally to field of digital image compression and, in particular, to encoding an original image to provide a coded representation of the original image, transcoding a first coded representation of an original image to provide a second coded representation, and decoding a coded representation of an original image. The invention also relates to a method of reconstructing an image, and to a coded representation of an original image.

BACKGROUND

The field of digital data compression and in particular digital image compression has attracted a great interest for some time.

The compression of images using a lossy format requires a number of decisions to be made. Firstly, the resolution at which the image is to be stored must be determined. This is usually driven by the application of the image and it is common to save using a number of different resolutions for different applications such as on-screen display, web publication, printing, previewing etc. Secondly there is a choice as to the quality or amount of loss that will be permitted. This choice directly affects the compression rate for the image and, so, is often application driven as well. Finally the progression order of the codestream may be important to the particular application. This order can affect how an image is progressively updated as it is transferred over a slow network connection such as the Internet.

A widely used standard for image compression is the "Joint Photographic Experts Group" or JPEG standard for image compression. A new image compression method herein after called JPEG2000 has recently been standardized by the ISO (ISO/IEC 15444-1:2000-Part I of JPEG2000). Part 11 of JPEG2000 is currently in the process of being standardized by the JPEG group and a draft standard has been published entitled "INFORMATION TECHNOLOGY—JPEG2000 IMAGE CODING SYSTEM: EXTENSIONS—JPEG2000 Part 11 Final Draft International Standard, Study Document Pre-Release B, 9 Mar. 2001". JPEG2000 (part 1) is an image compression standard that offers excellent compression and many features. One of the main features of JPEG2000 (part 1) is progressive transmission. JPEG2000 (part 1) supports a number of different progressive modes including progressive by quality and progressive by resolution. A JPEG2000 decoder can extract or receive a subset of the compressed image codestream, and use this to reconstruct a lower resolution or lower quality image.

The problem with older standards such as the previous JPEG standard was that these decisions concerning different resolutions had to be made at encode time. This meant that, often, many different versions of each image would need to be generated. One to serve as an original and numerous application specific versions. The JPEG2000 digital image compression standard improves on this situation by deferring these decisions to decode time. When using a JPEG2000 compressed image it is theoretically possible to store a single "original" and decode it differently for each application. For this reason, much is made of the potential applications of JPEG2000 in client server environments such as the Internet. In practice however, JPEG2000 does not in itself provide a solution to this problem, rather it is a tool which may be used in many different ways to achieve any given task.

SUMMARY OF THE INVENTION

It is an object of the present invention to substantially overcome, or at least ameliorate, one or more disadvantages of existing arrangements.

According to one aspect of the invention, there is provided a method of transcoding a first image file to a second image file, wherein the first image file comprises a single codestream and a table comprising references associated with different parsed forms of the single codestream for referencing segments of codestream header data and segments of the single codestream, the method comprising: selecting a parsed form of the single image codestream: locating, by using the table, those codestream segments associated with the selected parsed form; locating, by using the table, those codestream header data associated with the selected parsed form; and writing the located codestream header data and codestream segments as a single codestream of the selected parsed form to the second image file.

According to another aspect of the invention, there is provided a method of generating a first image file from an original image, the method comprising the steps of: generating a single codestream representative of the original image, wherein said single codestream comprises a plurality of different forms of the image; and generating a first image file, wherein the first image file comprises segments of the single codestream and segments of codestream header data associated with different parsed forms of the original image, and a table comprising references associated with the different parsed forms of the original image for referencing segments of codestream header data and segments of the single codestream.

According to still another aspect of the invention, there is provided a method of decoding a first image file to provide an image, wherein the first image file comprises a single codestream and a table comprising references associated with different parsed forms of the single codestream for referencing segments of codestream header data and segments of the single codestream, the method comprising: selecting a parsed form of the single image codestream: locating, by using the table, those codestream segments associated with the selected parsed form; locating, by using the table, those codestream header data associated with the selected parsed form; constructing a single codestream of the selected parsed form from the located codestream header data and codestream segments; and decoding the constructed single codestream to produce an image of the selected parsed form.

According to still another aspect of the invention, there is provided a method of transcoding a first coded representation of an original image to provide a second coded representation of a reduced resolution of said original image, wherein said original image was previously encoded using a S-level DWT and blocks of DWT coefficients were previously coded in sub-passes to provide said first coded representation, the method comprising the steps of: determining a desired reduced resolution level J of the first coded representation, wherein J is less than S; determining a number of sub-passes to extract from each coded block of the first coded representation based on a predetermined image quality at said desired resolution level J; and extracting those determined sub-passes to form said second coded representation of the original image, wherein a reconstructed image of the second coded representation of the original image is not significantly degraded visually compared with a reconstructed image of the first coded representation at said desired resolution level J.

According to still another aspect of the invention, there is provided a method of encoding an original image to provide a coded representation of the original image, the method comprising: transforming said original image with a S-level DWT transform to produce a plurality of subbands of DWT coefficients; quantising the DWT coefficients of each subband according to a quantisation table; dividing each subband into one or more codeblocks of quantised DWT coefficients; entropy encoding said codeblocks to form a number of coded sub-passes; and arranging said coded sub-passes into a number of block layers, wherein the codeblocks in resolution levels greater than resolution level l make no contributions to block layers $0, 1 \ldots , l$, so as to enable a reconstruction of a resolution of the original image of just visually acceptable quality.

According to still another aspect of the invention, there is provided a method of decoding a coded representation of an original image, wherein said original image was previously encoded using a S-level DWT transform and blocks of DWT coefficients were previously coded in sub-passes to provide said coded representation, the method comprising: determining a desired reduced resolution level J to decode, wherein J is less than S; determining a number of sub-passes to discard for each coded block based on an predetermined image quality at said resolution level J; discarding said determined sub-passes from said code blocks; and decoding those sub-passes not discarded to reconstruct said image at said desired reduced resolution level J, wherein said reconstructed image is not significantly degraded visually compared with an image reconstructed from said coded representation at said desired resolution level J using all said sub-passes.

According to still another aspect of the invention, there is provided a method of reconstructing an image, said image being encoded using a S-level DWT, wherein S is an integer and wherein blocks of DWT coefficients are coded in passes, the method comprising: determining a desired resolution J to decode, wherein J is less than S; determining a number of sub-passes to extract for each block code based on said resolution; extracting determined sub-passes from said block codes; and reconstructing said image from said extracted sub-passes at the desired reduced resolution J, wherein said reconstructed image is not significantly degraded visually compared with an image reconstructed from said coded representation at said desired resolution J using all said sub-passes.

According to still another aspect of the invention, there is provided apparatus for transcoding a first image file to a second image file, wherein the first image file comprises a single codestream and a table comprising references associated with different parsed forms of the single codestream for referencing segments of codestream header data and segments of the single codestream, the apparatus comprising: means for selecting a parsed form of the single image codestream: means for locating, by using the table, those codestream segments associated with the selected parsed form; means for locating, by using the table, those codestream header data associated with the selected parsed form; and means for writing the located codestream header data and codestream segments as a single codestream of the selected parsed form to the second image file.

According to still another aspect of the invention, there is provided apparatus for generating a first image file from an original image, the apparatus comprising: means for generating a single codestream representative of the original image, wherein said single codestream comprises a plurality of different forms of the image; and means for generating a first image file, wherein the first image file comprises segments of the single codestream and segments of codestream header data associated with different parsed forms of the original image, and a table comprising references associated with the different parsed forms of the original image for referencing segments of codestream header data and segments of the single codestream.

According to still another aspect of the invention, there is provided apparatus for decoding a first image file to provide an image, wherein the first image file comprises a single codestream and a table comprising references associated with different parsed forms of the single codestream for referencing segments of codestream header data and segments of the single codestream, the apparatus comprising: means for selecting a parsed form of the single image codestream: means for locating, by using the table, those codestream segments associated with the selected parsed form; means for locating, by using the table, those codestream header data associated with the selected parsed form; means for constructing a single codestream of the selected parsed form from the located codestream header data and codestream segments; and means for decoding the constructed single codestream to produce an image of the selected parsed form.

According to still another aspect of the invention, there is provided apparatus for transcoding a first coded representation of an original image to provide a second coded representation of a reduced resolution of said original image, wherein said original image was previously encoded using a S-level DWT and blocks of DWT coefficients were previously coded in sub-passes to provide said first coded representation, the apparatus comprising: means for determining a desired reduced resolution level J of the first coded representation, wherein J is less than S; means for determining a number of sub-passes to extract from each coded block of the first coded representation based on a predetermined image quality at said desired resolution level J; and means for extracting those determined sub-passes to form said second coded representation of the original image, wherein a reconstructed image of the second coded representation of the original image is not significantly degraded visually compared with a reconstructed image of the first coded representation at said desired resolution level J.

According to still another aspect of the invention, there is provided apparatus for encoding an original image to provide a coded representation of the original image, the apparatus comprising: means for transforming said original image with a S-level DWT transform to produce a plurality of subbands of DWT coefficients; means for quantising the DWT coefficients of each subband according to a quantisation table; means for dividing each subband into one or more codeblocks of quantised DWT coefficients; and means for entropy encoding said codeblocks to form a number of coded sub-passes and for arranging said coded sub-passes into a number of block layers, wherein the codeblocks in resolution levels greater than resolution level l make no contributions to block layers $0, 1 \ldots , l$, so as to enable a reconstruction of a resolution of the original image of just visually acceptable quality.

According to still another aspect of the invention, there is provided apparatus for decoding a coded representation of an original image, wherein said original image was previously encoded using a S-level DWT transform and blocks of DWT coefficients were previously coded in sub-passes to provide said coded representation, the apparatus comprising: means for determining a desired reduced resolution level J to decode, wherein J is less than S; means for determining a number of sub-passes to discard for each coded block based on a predetermined image quality at said resolution level J; means for discarding said determined sub-passes from said code blocks; and means for decoding those sub-passes not discarded to reconstruct said image at said desired reduced resolution level J, wherein said reconstructed image is not significantly degraded visually compared with an image reconstructed from said coded representation at said desired resolution level J using all said sub-passes.

According to still another aspect of the invention, there is provided apparatus for reconstructing an image, said image being encoded using a S-level DWT, wherein S is an integer and wherein blocks of DWT coefficients are coded in passes, the apparatus comprising: means for determining a desired resolution J to decode, wherein J is less than S; means for determining a number of sub-passes to extract for each block code based on said resolution; means for extracting determined sub-passes from said block codes; and means for reconstructing said image from said extracted sub-passes at the desired reduced resolution J, wherein said reconstructed image is not significantly degraded visually compared with an image reconstructed from said coded representation at said desired resolution J using all said sub-passes.

According to still another aspect of the invention, there is provided a computer program for transcoding a first image file to a second image file, wherein the first image file comprises a single codestream and a table comprising references associated with different parsed forms of the single codestream for referencing segments of codestream header data and segments of the single codestream, the computer program comprising: code for selecting a parsed form of the single image codestream: code for locating, by using the table, those codestream segments associated with the selected parsed form; code for locating, by using the table, those codestream header data associated with the selected parsed form; and code for writing the located codestream header data and codestream segments as a single codestream of the selected parsed form to the second image file.

According to still another aspect of the invention, there is provided a computer program for generating a first image file from an original image, the computer program comprising: code for generating a single codestream representative of the original image, wherein said single codestream comprises a plurality of different forms of the image; and code for generating a first image file, wherein the first image file comprises segments of the single codestream and segments of codestream header data associated with different parsed forms of the original image, and a table comprising references associated with the different parsed forms of the original image for referencing segments of codestream header data and segments of the single codestream.

According to still another aspect of the invention, there is provided a computer program for decoding a first image file to provide an image, wherein the first image file comprises a single codestream and a table comprising references associated with different parsed forms of the single codestream for referencing segments of codestream header data and segments of the single codestream, the computer program comprising: code for selecting a parsed form of the single image codestream: code for locating, by using the table, those codestream segments associated with the selected parsed form; code for locating, by using the table, those codestream header data associated with the selected parsed form; code for constructing a single codestream of the selected parsed form from the located codestream header data and codestream segments; and code for decoding the constructed single codestream to produce an image of the selected parsed form.

According to still another aspect of the invention, there is provided a computer program for transcoding a first coded representation of an original image to provide a second coded representation of a reduced resolution of said original image, wherein said original image was previously encoded using a S-level DWT and blocks of DWT coefficients were previously coded in sub-passes to provide said first coded representation, the computer program comprising: code for determining a desired reduced resolution level J of the first coded representation, wherein J is less than S; code for determining a number of sub-passes to extract from each coded block of the first coded representation based on a predetermined image quality at said desired resolution level J; and code for extracting those determined sub-passes to form said second coded representation of the original image, wherein a reconstructed image of the second coded representation of the original image is not significantly degraded visually compared with a reconstructed image of the first coded representation at said desired resolution level J.

According to still another aspect of the invention, there is provided a computer program for encoding an original image to provide a coded representation of the original image, the computer program comprising: code for transforming said original image with a S-level DWT transform to produce a plurality of subbands of DWT coefficients; code for quantising the DWT coefficients of each subband according to a quantisation table; code for dividing each subband into one or more codeblocks of quantised DWT coefficients; and code for entropy encoding said codeblocks to form a number of coded sub-passes and for arranging said coded sub-passes into a number of block layers, wherein the codeblocks in resolution levels greater than resolution level l make no contributions to block layers $0,1\ldots,l$, so as to enable a reconstruction of a resolution of the original image of just visually acceptable quality.

According to still another aspect of the invention, there is provided a computer program for decoding a coded representation of an original image, wherein said original image was previously encoded using a S-level DWT transform and blocks of DWT coefficients were previously coded in sub-passes to provide said coded representation, the computer program comprising: code for determining a desired reduced resolution level J to decode, wherein J is less than S; code for determining a number of sub-passes to discard for each coded block based on a predetermined image quality at said resolution level J; code for discarding said determined sub-passes from said code blocks; and code for decoding those sub-passes not discarded to reconstruct said image at said desired reduced resolution level J, wherein said reconstructed image is not significantly degraded visually compared with an image reconstructed from said coded representation at said desired resolution level J using all said sub-passes.

According to still another aspect of the invention, there is provided a computer program for reconstructing an image, said image being encoded using a S-level DWT, wherein S is an integer and wherein blocks of DWT coefficients are coded in passes, the computer program comprising: code for determining a desired resolution J to decode, wherein J is less than S; code for determining a number of sub-passes to extract for each block code based on said resolution; code for extracting determined sub-passes from said block codes; and code for reconstructing said image from said extracted sub-passes at the desired reduced resolution J, wherein said reconstructed image is not significantly degraded visually compared with an image reconstructed from said coded representation at said desired resolution J using all said sub-passes.

Other aspects of the invention are also disclosed.

BRIEF DESCRIPTION OF THE DRAWINGS

A number of implementations of the present invention will now be described with reference to the drawings, in which:

FIG. 13A illustrates the format of a media data box in the JPX file constructed in accordance with the fourth implementation;

FIGS. 13B and 13C illustrate the division of marker heads from marker bodies used when encoding codestream differences in packed packet headers (PPT) and packet length (PLT) markers in the media box of the constructed JPX file in accordance with the fourth implementation;

DETAILED DESCRIPTION INCLUDING BEST MODE

Figure 1:
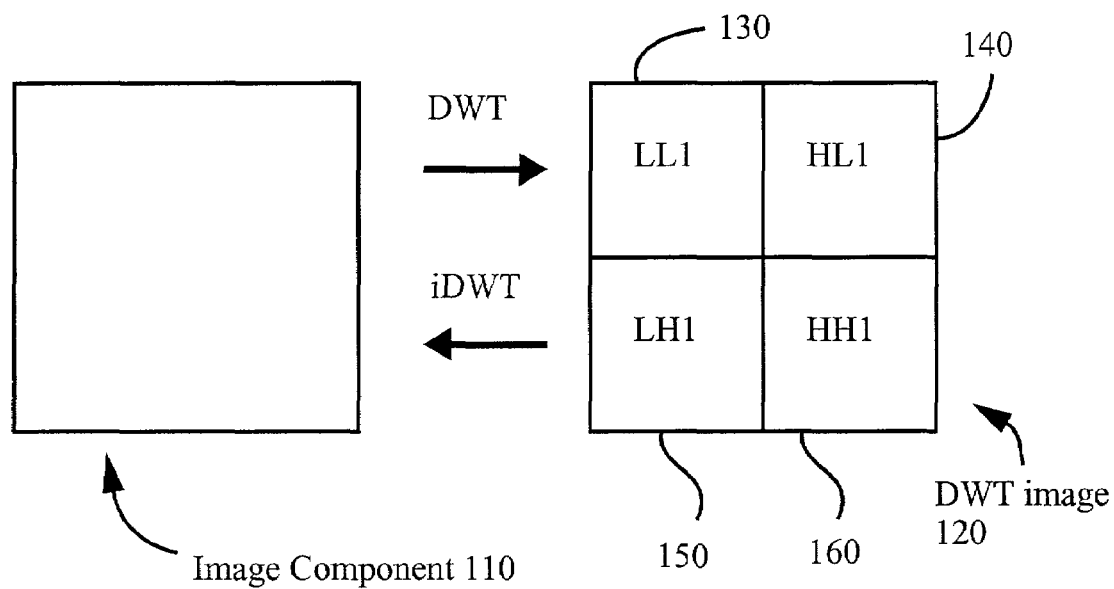
FIG. 1 illustrates an original image component and corresponding single level DWT image and two level DWT image according to the JPEG2000 standard (part 1)
Figure 1:
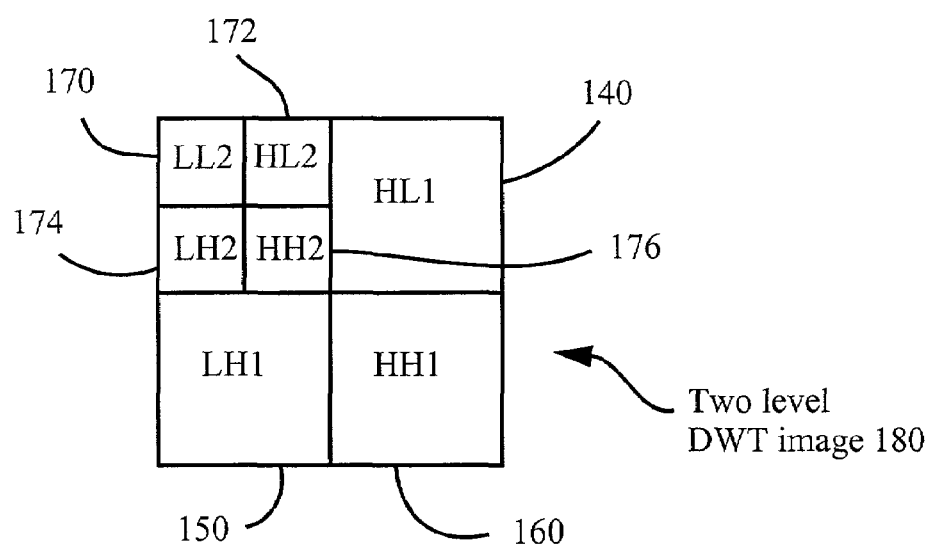

Where reference is made in any one or more of the accompanying drawings to steps and/or features, which have the same reference numerals, those steps and/or features have for the purposes of this description the same function(s) or operation(s), unless the contrary intention appears.

Before describing the implementations of the invention, a brief review of JPEG2000 (part 1 and part 11) will be first undertaken in order to assist in the understanding of the invention. Furthermore, for the purposes of the description of the implementations of the invention, the terminology used herein is the same as the terminology used in the aforementioned JPEG2000 (part 1 and 11) documentation, unless the contrary intention appears.

1.0 Review of JPEG2000

1.1 JPEG2000-The Discrete Wavelet Transform and Multi-Resolution Decoding

A single level discrete wavelet transform (DWT) of an image component is illustrated in FIG. 1. The image component 110 is decomposed into 4 subbands, LL1 130, HL1 140, LH1 150 and HH1 160, which form a single level DWT image 120. The DWT gives a multi-resolution description of an image. The LL1 subband 130 represents the image (component) at a reduced resolution. In particular the image is represented at a size with nominally half as many pixels per row, and nominally half as many pixels per column, as the original image.

A single level inverse DWT can be performed on DWT image 120 (the LL1, HL1 LH1 and HH1 subbands) to give the original image 110. Thus the DWT image 120 implicitly represents the image at two resolutions: namely the original image, referred to as resolution 1, and the LL1 subband, referred to as resolution 0.

Another single level DWT can be performed on the LL1 subband 130 analysing the LL1 subband into four subbands, LL2 170, HL2 172, LH2 174 and HH2 176, and giving a two-level DWT image 180, comprising the subbands LL2, HL2, LH2, HH2, HL1, LH1 and HH1. The LL2 subband represents the original image at a further lower resolution (and also represents the LL1 subband at a lower resolution). In particular the image is represented at a size with nominally a quarter as many pixels per row, and nominally a quarter as many pixels per column, as the original image. The subbands HL1, LH1 and HH1 are referred to as level 1 subbands. The subbands LL2, HL2, LH2 and HH2 are referred to as level 2 subbands. For convenience the original image may be referred to as the LL0 subband.

Higher level DWT images, and further reduced resolution representations of the image component, are obtained by further applications of the single level DWT on ensuing LL subbands. An S level DWT comprises a LLS subband and subbands HLS, LHS, HHS, HL(S−1), LH(S−1), HH(S−1) ..., HL1, LH1, and HH1. The number after the two-letter subband denomination refers to the DWT level. Thus HL(S−1) refers to the HL subband at level S−1. An S level DWT image implicitly represents the image at S+1 resolutions. These resolutions are referred to as resolution 0, resolution 1 ..., resolution S. Resolution 0 refers to the LLS subband, resolution 1 to the LL(S−1) subband, and so on. Thus resolution S refers to the original image.

To reconstruct resolution J of the image it is necessary to reconstruct the LLn subband, where n=S−J. The LLn subband is reconstructed from the subbands at levels S, S−1, ..., n JPEG2000 uses a DWT on each image component. Each subband is coded independently. Each subband can be decoded from the compressed image codestream independently. For example, for a single level DWT image the LL1 subband (or resolution 1 of the image) can be decoded and displayed without decoding the other level 1 subbands, HL1, LH1 and HH1. For higher level DWT images other resolution versions of the image can also be decoded and displayed by reconstructing the various LL subbands at each stage of the DWT analysis. For example, for a 3 level DWT image, the image can be displayed at resolution 1 by reconstructing the LL2 subband from the LL3, HL3, LH3 and HH3 subbands.

Figure 2:
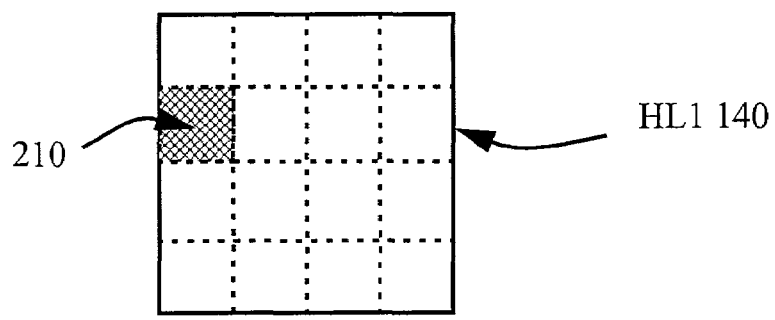
FIG. 2 illustrates the tiling of a subband into codeblocks according to the JPEG2000 standard (part 1)

Each subband of JPEG2000 is tiled into blocks, referred to as code-blocks. FIG. 2 illustrates a tiling of the HL1 subband 140 into 16 blocks, with one block indicated by shading 210. Each code-block is quantized giving an integer representation of the code-block coefficients. Each code-block is then (entropy) coded substantially independently. Each code-block is coded in order from its most significant bit-plane to its least significant bit-plane, with nominally three coding passes, (sometimes referred to as sub-passes) per bit-plane.

Figure 3:
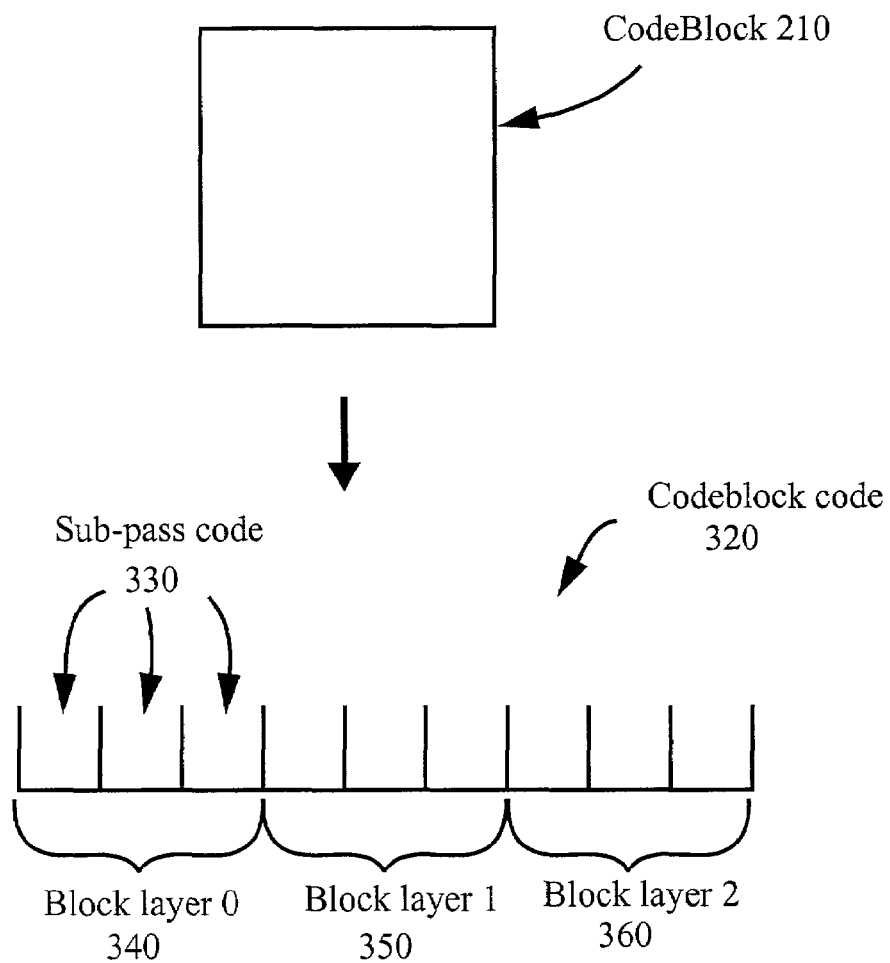
FIG. 3 illustrates the coding of a code block into block layers according to the JPEG2000 standard (part 1)

FIG. 3 illustrates the coding of such a code-block. A code-block 210 is coded into a compressed code-block or simply code-block 320. The code-block comprises a sequence of sub-pass code segments 330. The code-block is thus an ordered sequence of sub-passes code segments (or simply sub-passes). A code-block can be partitioned into block layers. For ease of explanation, the term block layer is used herein to refer to those sub-passes of a codeblock which contribute to a corresponding quality layer. Each quality layer successively and monotonically improves the image quality, so that the decoder shall be able to decode the code-block contributions contained in each layer in sequence. Thus a quality layer can be said to be a collection of corresponding block layers at all resolutions. FIG. 3 shows an example of a codeblock partitioned into three layers: namely block layer 0, 340, block layer 1, 350, and block layer 2, 360. Each block layer contains a non-negative number of sub-passes. The first layer comprises the first number of sub-passes, the second layer, a next number of sub-passes and so on. It is important to note that a block layer of a codeblock can be empty.

A decoder reconstructs the code-block from the block code, by undoing the entropy encoding. A lower quality representation of the code-block can be obtained by decoding only a first number of sub-passes. For example, in FIG. 3 the code-block could be reconstructed from layer 0 only, or layers 0 and 1. Thus truncating a block code at some sub-pass boundary represents the code-block at a lower quality. Truncating a block in this way is a form of quantization. By coding bit-planes an embedded form of quantization of the code-block is effected. For each extra bit-plane included in the block code the effective quantization step size decreases by a factor of two.

A layer of the image is constructed from a collection of corresponding block layers. That is layer 0 comprises block layer 0 for each code-block in the DWT image, layer 1 comprises block layer 1 for each code-block and so on. A block layer can be empty, in that no sub-passes are contained within the block layer. An image can be decoded by decoding layer 0 only (and performing the appropriate inverse DWT, component transform etc). Decoding layer 0, means decoding block layer 0 for each code-block. Thus each code-block, and hence the image, is decoded at a lower quality that is represented in the compressed image codestream.

A region of codeblocks in each resolution level is collected within a precinct where each block layer within a precinct is arranged into a packet. Therefore, a packet can be thought of as the basic building blocks for the JPEG2000 compressed codestream, where a packet contains all the compressed image data from a particular precinct, block layer, and a resolution level.

Figure 7:
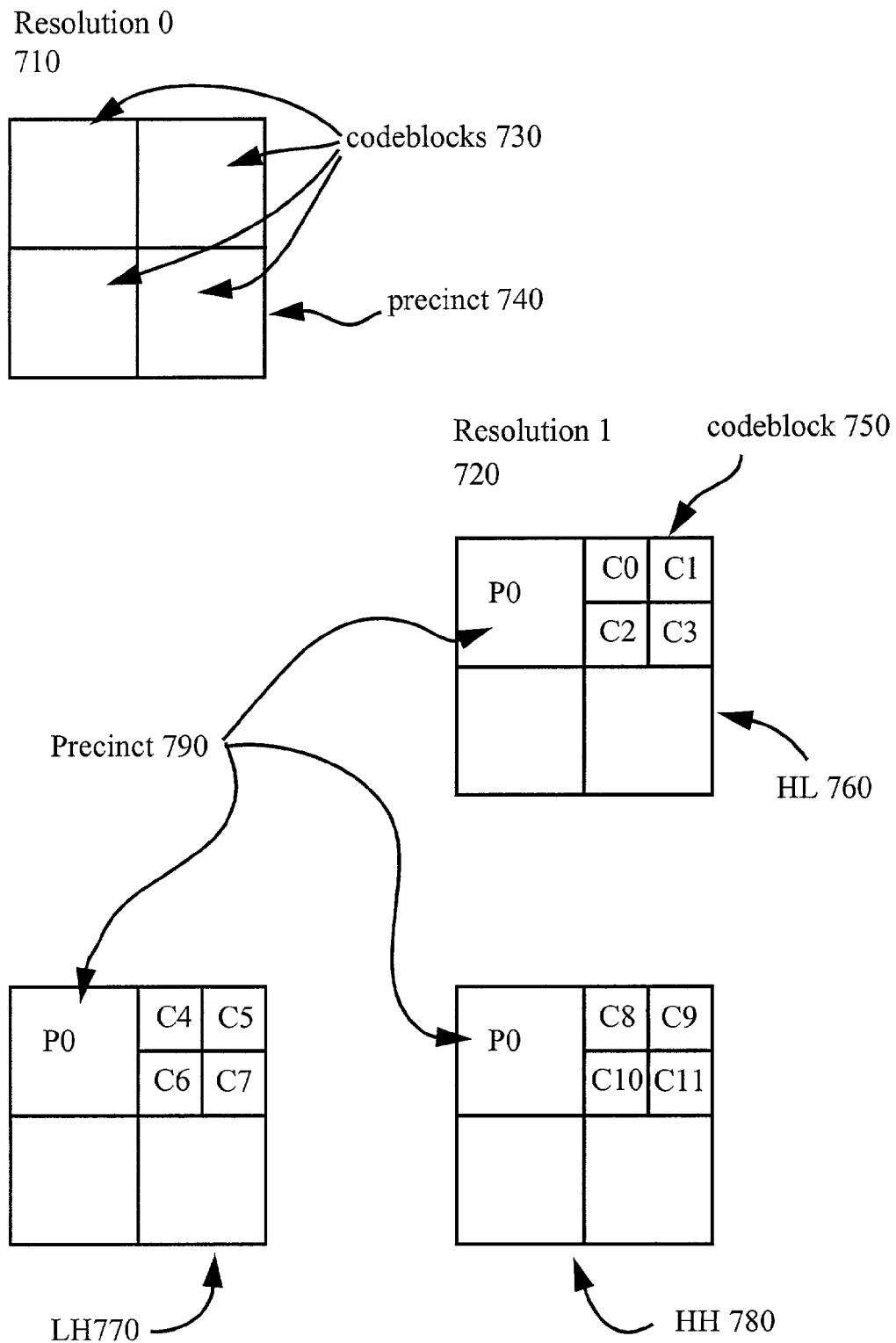
FIG. 7 illustrates a possible relationship between codeblocks and precincts at one resolution and a higher resolution for one block layer according to the JPEG2000 standard (part 1)

FIG. 7 illustrates a possible relationship between codeblocks and precincts at resolution 0 (710) and at resolution level greater than 0 (720) for one block layer. Here, in resolution 0, four codeblocks, 730, are collected into a single precinct 740. In resolution 1, each subband is divided into four precincts where P0, 790, denotes the first precinct occupying the top left quadrant of each subband. In addition, each precinct in each subband is further divided into four codeblock partitions as shown in 750. The second precinct occupies the top right quadrant of each subband and contains four codeblock numbered from C0 to C3 750 for the HL subband 760. In the LH subband 770, the codeblocks are numbered from C4 to C7 and in the HH subband 780, the codeblocks are numbered from C8 to C11. Similarly, the third precinct occupies the bottom left quadrant and the last precinct occupies the bottom right quadrant of each subband respectively. Thus, a precinct is a region defined at a resolution level and consists of codeblocks 730 in the LL band for resolution 0, or codeblocks (ie. C0 to C11) in each of the 3 sub-bands (HL, LH and HH) for resolution level greater than 0.

The JPEG2000 bitstream comprises a sequence of atomic units called packets. Each packet contains encoded image information for a single resolution, (quality) layer, component and spatial region of the image tile. The structure of a packet is described in detail with reference to FIG. 16. Each packet has a packet header (16510) and a packet body (16520). The packet header (16510) contains useful decoding information corresponding to each codeblock. The packet body (16520) consists of the actual codeblock data in block-raster order from each of the 3 sub-bands HL, LH and HH in that order for resolution levels greater than 0, or from codeblocks in the LL band only for resolution 0, for a specific precinct and a specific block layer.

The JPEG2000 codestream wraps the bitstream and provides an encoding of additional parameter information required by a bitstream decoder. The basic structuring unit for the codestream is a marker depicted in FIG. 16A, which has a fixed size length (16120) and label (16110) fields followed by a type specific data field (16130) of zero or more bytes.

Figure 16A:
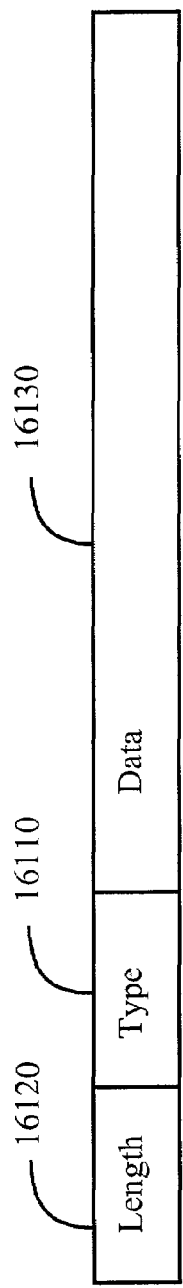
FIG. 16A illustrates the structure of a marker of a JPEG2000 codestream according to the JPEG2000 standard (part 1)
Figure 16B:
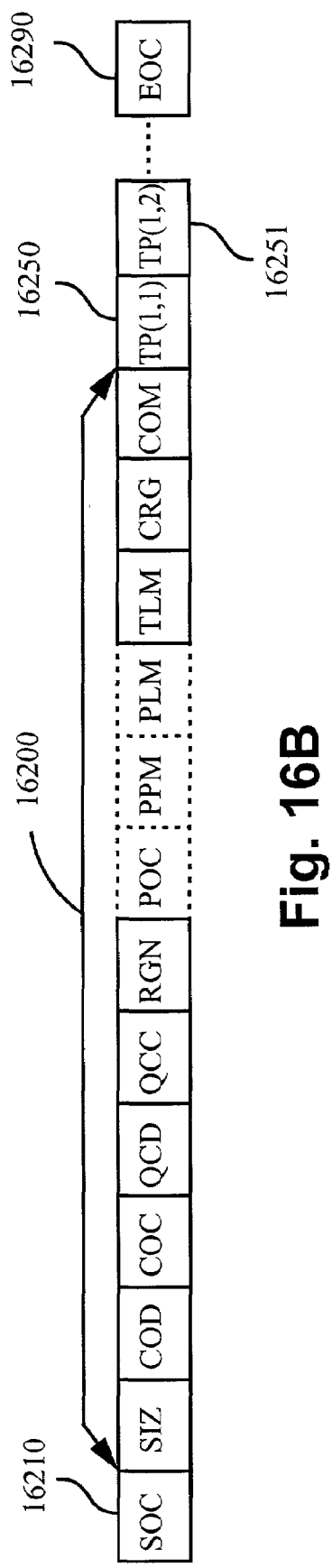
FIG. 16B illustrates the basic structure of a JPEG2000 codestream file according to the JPEG2000 standard (part 1)
Figure 16C:
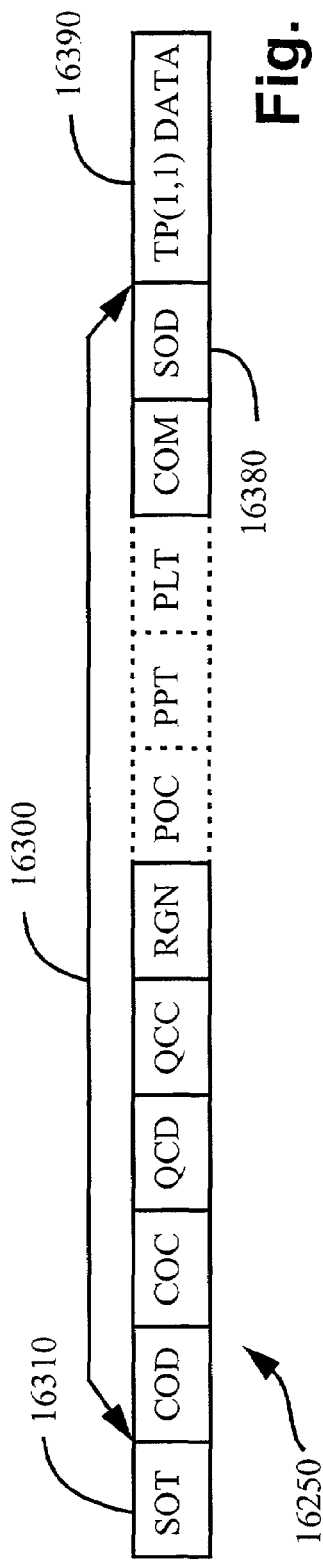
FIG. 16C illustrates the syntax of a first tile part according to the JPEG2000 standard (part 1)

The basic structure of a JPEG2000 part 1 codestream is outlined in FIG. 16B. The codestream comprises a start of codestream marker (SOC) (16210), then a sequence of markers that comprise the main header (16200), followed by a sequence of 1 or more tile parts (16250, 16251), and is concluded by an end of codestream marker (EOC) (16290). The image is encoded as one or more tiles in scan order. Each tile can be divided into a number of parts for the purpose of interleaving—for example to produce a resolution progressive codestream. Each tile code comprises one first tile part (16250) and zero of more non-first tile parts (16251)

The syntax of the first tile part (16250) for each tile may be different from the syntax for all subsequent parts (16251) for that tile. The syntax of a first tile part is described with reference to FIG. 16C. It is opened by a "start of tile part" (SOT) marker (16310) and is optionally followed by a sequence of header markers (16300) which form the tile header. Information in these markers overrides the corresponding information in the main codestream header (16200) for the corresponding tile only. The tile header is closed by a "start of data marker" (SOD) (16380) and JPEG2000 bitstream for the tile (16390) ensues.

Figure 16D:
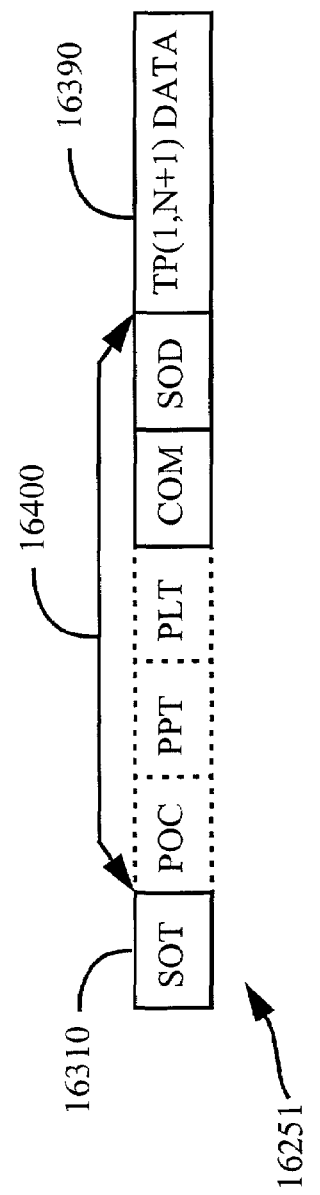
FIG. 16D illustrates the syntax of non-first tile part according to the JPEG2000 standard (part 1)
Figure 16E:
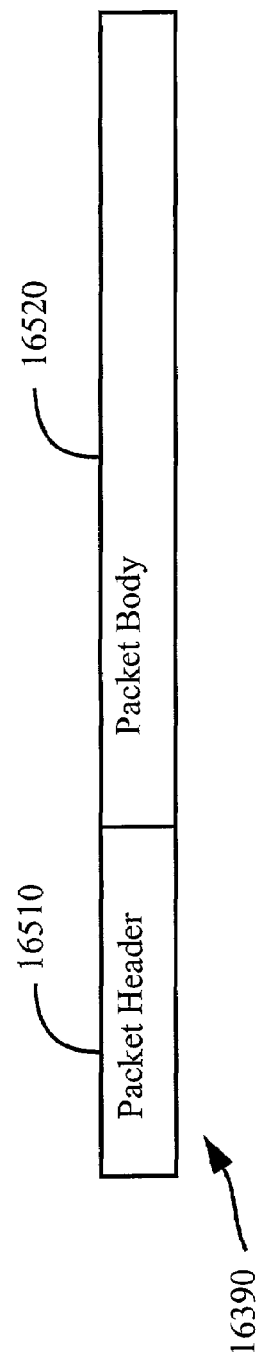
FIG. 16E illustrates the basic structure of a packet according to the JPEG2000 standard (part 1)

The syntax of all non-first tile parts for each tile is described with reference to FIG. 16D. It is opened by a "start of tile part" marker (16310) and is optionally followed by a sequence of header markers (16400) which form the tile-part header. Information in these markers is supplementary to the information in the tile header for that tile. The tile-part header is closed by a "start of data marker" (16380) and JPEG2000 bitstream for the tile (16390) ensues. The packet header may be written in the bitstream immediately prior to its corresponding packet body. Alternatively, all packet headers for a particular tile part may be concatenated and written in a packet headers, tile part header (PPT) marker in the tile part header (16300, 16400). Alternatively, all packet headers for a particular tile may be concatenated and written in a PPT marker in the tile header (16300). Alternatively, all packet headers for an entire image may be concatenated and written in a packed packet headers, main header (PPM) marker in the main header (16200).Packet length information may optionally be (redundantly) included in codestream markers. Again there are three options. The sequence of packet lengths corresponding to the packets contained a single tile part may be written in a packet length, tile part header (PLT) marker in the tile part header (16400) for each tile part in the codestream. Alternatively, the sequence of packet lengths corresponding to the packets contained a single tile may be written to a PLT marker in the tile header (16300) for each tile in the codestream. Alternatively, the sequence of packet lengths corresponding to all packets in the codestream may be written to a packet length, main header (PLM) marker in the main header (16200).

1.2 Codestream level parsing of JPEG2000

There are several different possible ways of arranging packets. For example, a possible progression of the packets is layer-resolution level-component-position. In this particular progression order, packets are interleaved from the beginning of the codestream data for each layer, for each resolution level, for each image component, and for each precinct. This type of progression is useful when low sample accuracy is most desirable but information about all image components is needed. The ordering of the packets can progress along four axes: layer, component, resolution level and precinct.

Each layer at each resolution (that is block layers for those blocks in the subbands at given DWT level) can be extracted separately from the compressed image codestream. A JPEG2000 compressed codestream can be manipulated in several ways at various levels. At the packet level, the packets in the bitstream can be rearranged or discarded. The simplest rearrangement of packets is to change the progression order. Alternatively, packets can be discarded to construct a new bitstream of a lower resolution version of the original compressed image. At the codeblock level, packets can be reconstructed by decoding and re-encoding one or more packets. Packet headers are modified but codeblocks (ie. packet body) are not entropy decoded and re-encoded. An example codeblock level manipulation is to change the precinct size of the compressed bitstream. If the original encoding used precincts of a particular size then packets can be decoded and merged into larger packets to obtain a larger precinct size. Similarly, if a smaller precinct is required, then a packet can be broken into several smaller packets. At the lowest level, the compressed image data is allowed to be decoded, possibly retransformed and re-encoded to form a new bitstream.

For each tile, the packets are written in a predefined order. The default order may be specified in the coding style default (COD) or coding style component (COC) markers in the main or tile part headers. In addition to this, the progression order may change according to information contained in progression order change (POC) markers. Progression order change information may be included in the main, tile and tile part headers without prior warning. Comments and extensions (not defined by the standard) may also be included in any of the main, tile or tile part headers via a comment (COM) marker.

1.3 File Syntax and File Level Parsing of JPX Files

The JPX file format is defined in part 2 of the JPEG2000 draft standard and comprises a set of extensions to the JP2 file format which is defined in the JPEG2000 standard (part 1). The JP2 file format is an optional format that applications may choose to wrap JPEG2000 compressed image data.

Figure 15A:
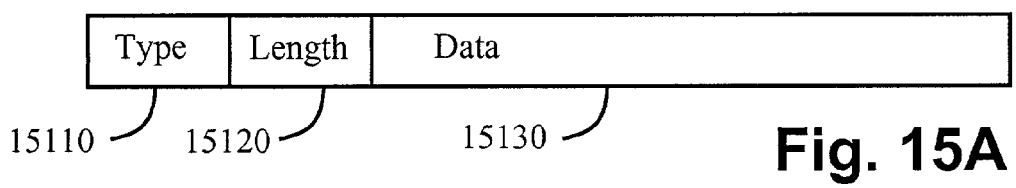
FIG. 15A illustrates the structure of a box, which is the basic structuring unit used in the JP2 and JPX files according to the draft JPEG2000 standard (part 1 and part 2)

The structuring element for a JPX file is a box, which is depicted, in greater detail in FIG. 15A. Each box comprises a header part containing a fixed size label (15110) and a box length (15120), immediately followed by a data part (15130), the format of which is determined by the box's label (also denoted its type).

Figure 15B:
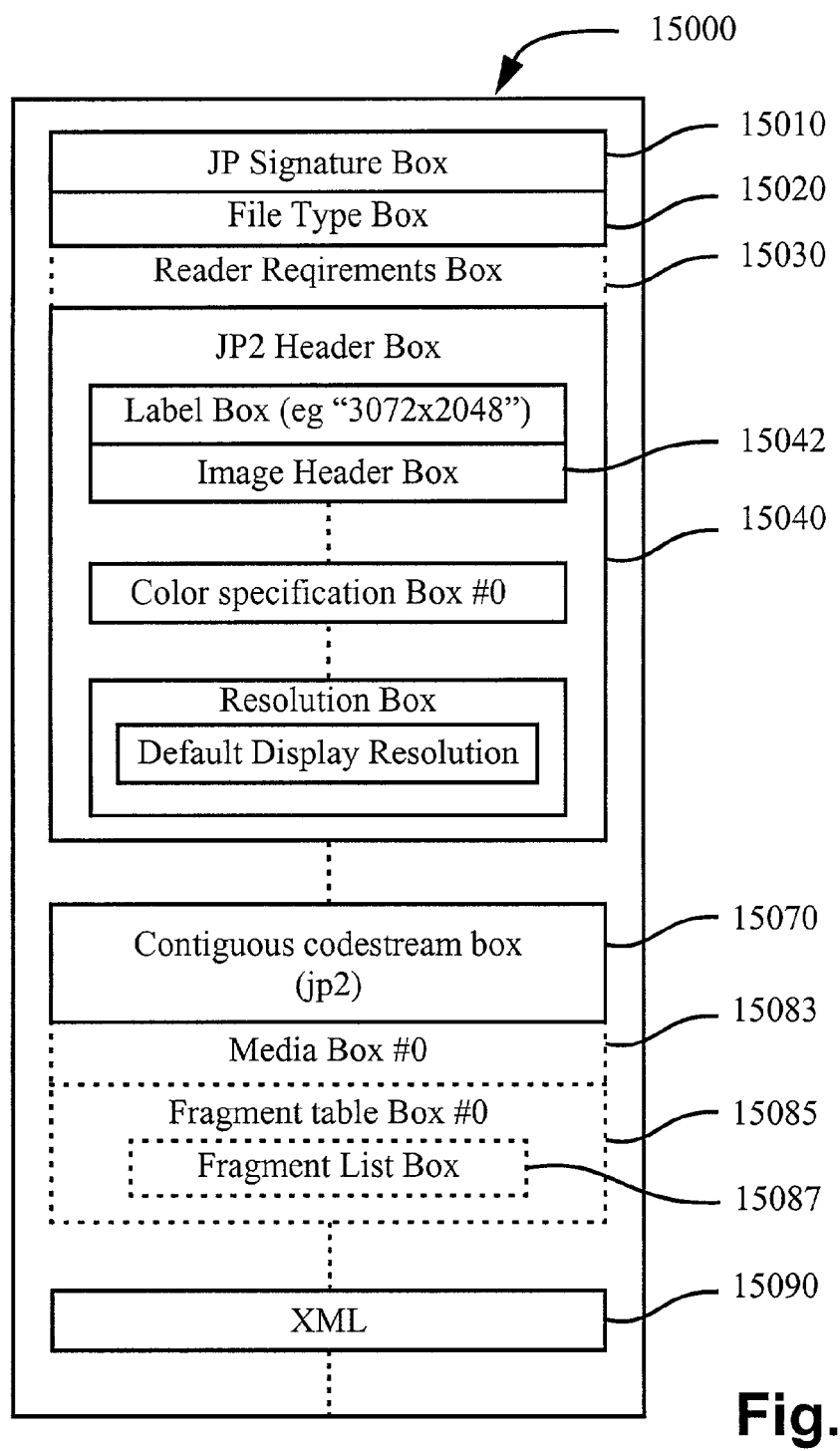
FIG. 15B illustrates the basic structure of an example JP2 file according to the JPEG2000 standard (part 1)

The basic structure of a JPEG2000 Part 1 file (JP2) is exemplified in FIG. 15B. The file (15000) is started with a signature box (15010) a file type identifier box (15020) and a header box (15040) which contains a number of sub-boxes each containing fixed information about the image including its colour space, resolution and pixel dimensions. There is at least one contiguous codestream box (15070) containing a JPEG2000 part 1 (master) codestream. The file may also contain any number of metadata and supporting boxes such as XML boxes (15090). It is legal for a JP2 file to contain boxes, which are not specified in the JP2 standard. In FIG. 15B, such boxes are depicted with a dashed outline. The reader requirements box for example (15030) is defined by the JPX file format. These "unknown" boxes are ignored by a JP2 reader.

Figure 15C:
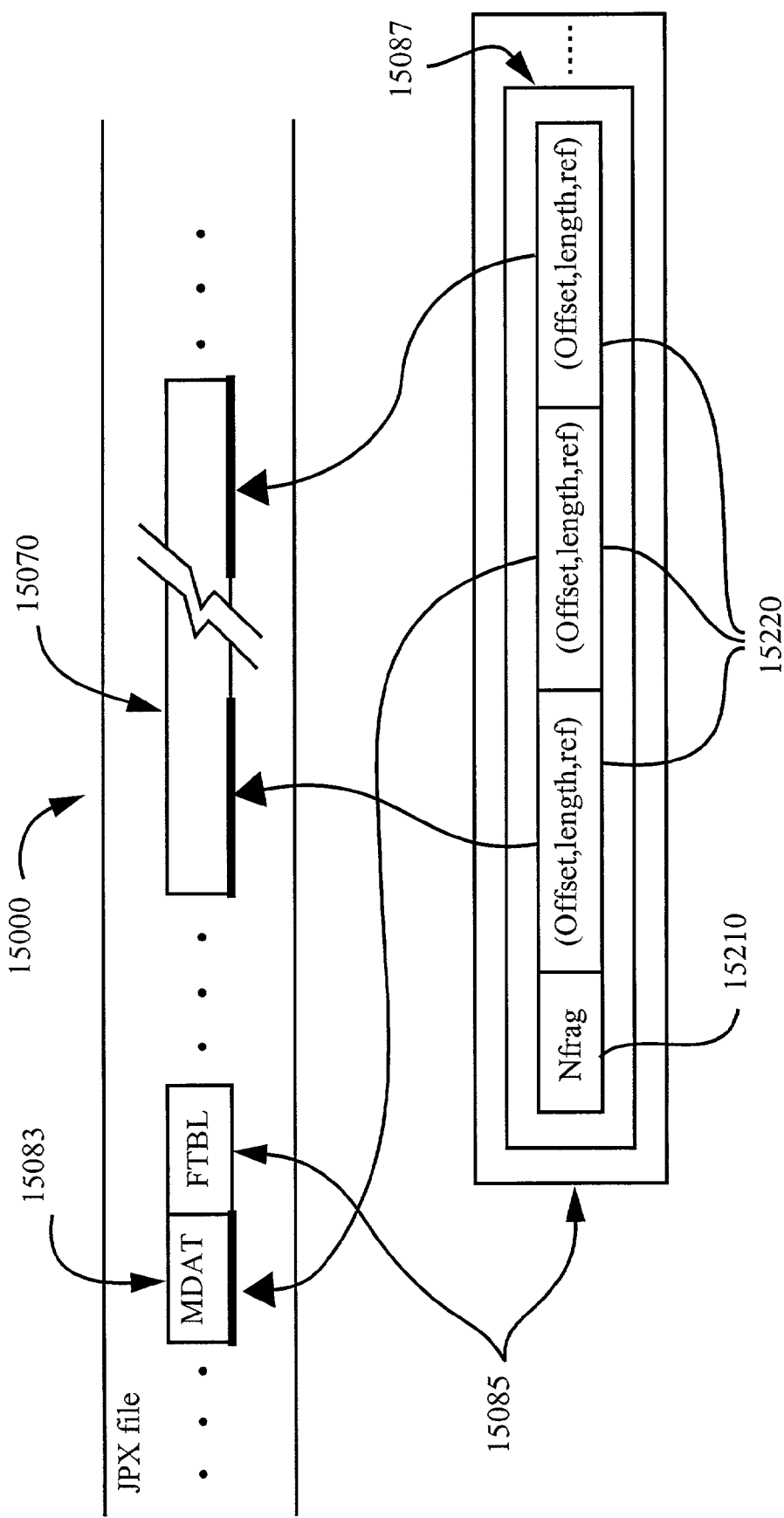
FIG. 15C illustrates the fragment table extensions to a JP2 file format file according to the draft JPEG2000 standard (part 11)

One of the JPX extensions is the ability to include codestreams by a sequence of references. This interesting feature is described with reference to FIG. 15C. These referenced codestreams are anchored in the file using a fragment table box (15085). The fragment table box contains a single fragment list box (15087), which comprises a fragment count (15210) and a sequence of one (1) or more offset, length, data-reference triples (15220). Each triple defines a segment of a codestream such that all the segments can be concatenated to recover a complete codestream. Usually these codestream fragments will reside in media data or MDAT boxes (15083) to prevent their misinterpretation by JP2 readers. The fragment table idea is a technology drawn from QuickTime™ where it is used to splice together segments of video and audio. In the JPEG2000 context its proposed applications include:

- allowing editors to save only the areas of image data they have changed;
- distributing an image across several disks for faster access;
- distributing an image across the Internet so that users are only allowed access to certain portions of the total codestream; and
- reusing headers across multiple codestream (as is permitted for example in JPEG).

2.0 Theory of Distortion Modelling Underlying the Implementations

The following analysis undertaken by the inventors provides a basis for an understanding of the implementations. The analysis is very approximate, in that several assumptions are made that are often not met fully in practice. Nevertheless the general idea of the analysis is useful for an understanding of the implementations.

A 1-1 normalised DWT is a DWT where the lowpass filter, and highpass filter satisfy, $$\sum_n h0(n) = 1 \quad \sum_n (-1)^n h1(n) = \pm 1$$

where h0(n) is the lowpass filter and h1(n) is the highpass filter.

Thus the DC gain of the lowpass filter is 1, and the average value of the LL1 subband is the same as the input image. Such a normalisation is useful for the multi-resolution decoding. With this normalisation each LL subband has the same average value as the original image, and thus the amount of scaling necessary for display, if any, is easily determined. For example, the Haar discrete wavelet transform filters with 1-1 normalisation are ½{1, 1} and ½{−1, 1}.

For the purposes of this analysis we now consider the Haar discrete wavelet transform filters. It is convenient to describe a single level one-dimensional Haar DWT with a transform matrix, $$A = \frac{1}{2}\begin{bmatrix} 1 & 1 \\ 1 & -1 \end{bmatrix}.$$

If $x=[x_0 \; x_1]^T$ is an input vector of two samples (ie a two sample segment of the input signal), the output signal y is given by $$y = Ax$$

Following the compression and decompression process the subband vectors y are quantized and dequantized to give a dequantized vector y'. The reconstructed vector x' is then given by $$x' = A^{-1}y'$$

The resulting expected or mean square error is, $$mse = \frac{1}{2}E\{(x'-x)^T(x'-x)\}.$$

Using matrix algebra gives, $$mse = \frac{1}{2}E\{(A^{-1}y' - A^{-1}y)^T(A^{-1}y' - A^{-1}y)\} \quad (1)$$

$$= \frac{1}{2}E\{(y'-y)^T(A^{-1})^T A^{-1}(y'-y)\}$$

$$= E\{(y'-y)^T(y'-y)\}$$

since $(A^{-1})^T A^{-1} = 2I$. That is, for one dimension, the mean square error in the output signal is twice that on average as the average of the mean square error in the subband signals. In two dimensions the factor is 4. Thus the error in the level 1 subbands is magnified by 4 when reconstructing the output image (in the inverse DWT).

For uniform quantization of a signal at a high rate (ie using a quantization step size that is significantly smaller than the average signal magnitude) the mean square error is given by, $$mse = \frac{q^2}{12}$$

where q is the quantisation step size.

Equation (1) can be expanded to give, $$mse = E\{(y'_0-y_0)^2 + (y'_1-y_1)^2\} = E\{(y'_0-y_0)^2\} + E\{(y'_1-y_1)^2\} \quad (2)$$

That is the mean square error is the sum (one could say weighted average) of quantization errors from each subband. Selecting a quantization step size of $q/\sqrt{2}$, and substituting into the above equations, gives, $$mse = \frac{(q/\sqrt{2})^2}{12} + \frac{(q/\sqrt{2})^2}{12} = \frac{q^2}{12} \quad (3)$$

Hence, roughly speaking, using a uniform quantizer of step size $q/\sqrt{2}$ in the subbands, is equivalent (in a mean square error sense) to using a quantizer of step size q on the original signal. In two dimensions, using a uniform quantizer of step size q/2 is then equivalent to using a quantizer of step size q on the original image (since there are four subbands). Note, as discussed below the high rate assumption is often violated, so this result must be treated carefully.

For bit-plane coders, such as JPEG2000, as mentioned above, quantization may be effected by discarding bit-planes. Discarding one less bit plane (or equivalently coding one extra bit plane) is like using a quantizer of step size q/2 instead of step size q. Hence, roughly speaking, coding down to bit-plane plane n−1 (that is coding bit planes n−1, n, n+1 . . . ) of a single level DWT image is equivalent to coding down to bit n of the corresponding original image, in terms of mean square error. That is one extra bit-plane is needed in the (single level DWT) subband domain as compared to the original image domain for comparable mean square error (when using a 1-1 normalised transform). In general one extra bit-plane is needed for each DWT level in order to preserve the mean square error.

Dropping one bit-plane is the same as doubling the quantization step size, which is quite a coarse step down in quality. By using nominally three coding passes per bit-plane, JPEG2000 offers finer graduation of quantization when discarding coding passes. Thus while a given quantization step size (larger than the quantization step size used for coding a block) cannot be achieved exactly by discarding some number of coding passes, it can be approximated to a reasonable degree.

The simple analysis so far is based on several assumptions that are not strictly met in practice. JPEG2000 employs non-orthogonal filters (whereas orthogonal filters were used in the above matrix algebra), but nonetheless the JPEG2000 filters behave roughly like orthogonal filters. Also the filters are overlapping. However, the above analysis can be extended to cover overlapping filters as well. The weakest assumption is probably that of a high-rate. In practice for the HL1, LH1 and especially HH1 subbands many coefficients are much smaller than the quantization step size. This has the effect that in these subbands the mean square error, for a quantization step size of q/2, is much smaller than $(q^2/4)/12$. The mean square error in the output image is then smaller than $q^2/12$. In the limit as these subbands contribute zero error the output image mean square error is the same as that of the LL1 subband $((q^2/4)/12)$. That is there is no error magnification. However, in practice not all coefficients are zero in the high frequency subbands and there is some error magnification in the synthesis from lower resolutions.

The mean square error, between a decompressed image and the original image, provides a rough measure of the quality of the decompressed image. The mean square error implies a quantization step size, q, for quantization of the original image, which in turn implies a quantization step size for each subband: notably quantization step sizes that decrease by a factor of 2 for each increasing DWT level. For the level 1 subbands the step size is q/2, for the level 2 subbands it is q/4 and so on. Coding an image in this fashion means that the LL1 subband is quantized with a step size of q/2, the LL2 subband with a step size of q/4 and so on.

Each LL subband, including the LL0 subband (original image) can be viewed as an image in its own right. For a 1-1 normalised transform, each LL subband has the same nominal range. Thus using the same effective step size on each such LL image will give a comparable mean square error, and hence roughly speaking the same quality. Thus if a step size of q is sufficient for the original image a step size of q should be sufficient for display of any of the LL subbands. The above scenario for quantization step sizes means that each LL subband has effectively been quantized with a much finer quantization step size. For example the LL1 subband is quantized with a step size of q/2, which corresponds to one extra bit-plane. The LL2 subband is quantized with a step size of q/4, which corresponds to 2 extra bit-planes. The extra-bit planes that each LL subband is effectively coded with, one bit-plane for each increasing DWT level, is not needed to give a comparable quality for displaying the image at a lower resolution. Thus if comparable quality if desired, these extra bit-planes can be discarded.

Quantization step sizes in JPEG2000 can be different for each subband. However, a reasonably strategy is to use the same step-size weighted by the l2-norm of the corresponding synthesis basis filter. The effect then is to use step sizes related approximately as described above (roughly decreasing by a factor of 2, for each increasing DWT level) for the 1-1 normalised DWT. JPEG2000 also allows truncation of each block code at any sub-pass (which as discussed above is a form of quantization). Lagrangian algorithms can be used to determine the truncation point for each block code so as to minimise the distortion of the decompressed image for a given rate. The distortion measure is typically either the mean square error, or a weighted version thereof. The Lagrangian algorithm, although finding the optimum termination points, for the case of the unweighted mean square error, will roughly follow the quantization strategy outlined above (the quantization step size decreasing by a factor of 2, for each increasing DWT level, relative to a 1-1 normalised DWT). Thus in both cases roughly one extra bit-plane is coded for each increasing DWT level.

The main weakness in the above arguments resides in the validity of the high-rate assumption. Typical imagery, compressed to typical rates, has many zero valued quantized coefficients in the high frequency subbands, it is not necessary to select a quantization step size quite as small as q/2 in the level 1 subbands (q/4 in the level 2 subbands etc) in order to achieve an equivalent distortion to that with quantizing the original image with a step size of q. The effect is that less than one extra bit-plane is coded for each increasing DWT level. Also when a weighted mean square error is used the rule of thumb of one extra bit-plane per level does not hold. However, typical weights that increase with increasing DWT level (decreasing frequency) actually suggest a greater saving in bits at resolutions 1 and 2 (counteracting the reduction in bit savings from the weakness of the high rate assumption). Visual experiments can also be done to determine a quantization step size, for a 1-1 (or any) normalised transform, for each subband, that results in a just noticeable error. Typical results give a decreasing quantization step size with increasing DWT level, at least for the first few levels. For example the following table gives the quantization step sizes that result in just noticeable distortion (JND), at some near standard viewing conditions, for the 1-1 normalised Daubechies 9/7 DWT. The results were determined by the inventors in a similar manner to that described in Watson et al (A. B. Watson, G. Y. Yang, J. A. Solomon, and J. Villasenor, "Visibility of wavelet quantization noise", IEEE transactions on Image Processing, Vol 6. (8), 1997, pp. 1164–1175).

TABLE A

| sub-band/level | 1 | 2 | 3 | 4 | 5 | 6 | 7 |
|---|---|---|---|---|---|---|---|
| LL | 3.5241 | 1.5655 | 1.2589 | 1.5129 | 2.5807 | 4.2838 | 3.7237 |
| HL/LH | 9.7500 | 2.5877 | 1.6696 | 1.5932 | 2.1681 | 3.6620 | 2.9776 |
| HH | 24.5784 | 4.3179 | 1.8491 | 1.3709 | 1.4097 | 1.7896 | 1.7480 |

For example according to the table for the subband HH2 a quantization step size of 4.3179 results in just noticeable distortion in the reconstructed image. These particular results are for illustrative purposes only and should not be used as definitive results for selecting quantization step sizes. Similar tables can be found in Watson et al, noting that in Watson et al the normalisation of the transform is more like that of the $l_2$-normalisation. To translate roughly between the $l_1$ and $l_2$ normalisation, subbands at level j (and hence quantization step sizes) need to be multiplied by $2^j$.

For greater compression these quantization step sizes can be scaled up, similar to the case with the quantization matrix used in JPEG. For example scaling up the values in the quantization table by two will still offer reasonable image quality.

Consider reconstructing an image at a reduced resolution S−1, where there are S DWT levels, where each subband was quantized according to the above quantization table, and each quantized subband then losslessly entropy encoded. Reconstructing the image at the reduced resolution S−1 involves reconstructing the LL1 subband. In this case the level 2 subbands effectively become level 1 subbands in the iDWT used to reconstruct the image. That is, for example, the HH2 subband, which was quantized with a step size of 4.3179, effectively becomes the HH1 subband in the reconstruction of the reduced resolution output (LL1 subband) image. Since it is the HH1 subband (in the output image synthesis), the JND quantization step size, according to the quantization table, is 24.5784, which is considerably higher than the step size with which subband was actually quantized (the difference in quantization step size here is of the about of 5.7 times, which corresponds to coding about 2.5 extra bit-planes). The same is true for the other (old) level 2 subbands, and also to a lesser extent the old level 3 (which now become level 2) subbands. These subbands have been "over" coded (that is quantized with a step size smaller than necessary) with respect to reconstructing the image at resolution S−1. Similar observations can be made for decoding at further lower resolutions, S−2, S−3 etc. Thus for decoding at a reduced resolution one finds that particularly the new lowest level subbands are over-coded. That is larger quantization step sizes could be employed, effected by discarding bit-planes, without significantly degrading the quality of the reconstructed lower resolution image, as compared to that of the full resolution image (when quality is defined in a resolution independent way).

According to the above quantization table A, the new level 3 and upward subbands are not so "over" coded. (Consider for example decoding at resolution S−1.), and in fact may be "under" coded. Nevertheless, the first two levels used to represent any image typically contribute a significant portion of the compressed image, and thus by discarding bit-planes, or fractions there-of, a significant saving in bit rate can be made.

To overcome the possible under-coding it was desirable, for multi-resolution decoding applications, to modify the quantization table entries so that a step size at a higher level is never greater than one at a lower level as given in the following table B.

TABLE B

| sub-band/level | 1 | 2 | 3 | 4 | 5 | 6 | 7 |
|---|---|---|---|---|---|---|---|
| LL | 3.5241 | 1.5655 | 1.2589 | 1.2589 | 1.2589 | 1.2589 | 1.2589 |
| HL/LH | 9.7500 | 2.5877 | 1.6696 | 1.5932 | 1.5932 | 1.5932 | 1.5932 |
| HH | 24.5784 | 4.3179 | 1.8491 | 1.3709 | 1.3709 | 1.3709 | 1.3709 |

This modified table is referred to as the JND quantization table. Mean square error considerations also lend weight to modifying the quantization in this direction. For the LL0 subband (ie original image) a quantization step size of around 5 is at threshold, according to this experimental procedure, and thus a step size of 5 for the LL0 subband is included as part of the JND quantization table.

Lower resolution decoding is typically for browsing or quick image manipulation, so that the upmost image quality is not typically necessary. For this reason the undercoding of some subbands at lower resolutions is not necessarily a big problem, so more radical strategies, as employed by the original table could also be used for multi-resolution decoding.

Thus using psycho-visual quantization strategies (ie quantization given by the JND quantization table B), and mean square error optimised strategies, both suggest some saving in bits for reduced resolution coding for obtaining a quality comparable to that of the original (compressed) image.

Thus it is expected that typically at least some fraction of an extra bit-plane is coded per level than necessary, and these extra fractions of bit-planes can be discarded while obtaining an equivalent quality at a reduced resolution.

As a rough rule of thumb the inventors have found, for colour image compression, assuming sufficient DWT levels are used, that a target bit rate of 1 bit per (monochrome) pixel (that is a compression ratio of 8) typically provides good image reconstructed image quality. Three DWT levels is usually sufficient for this approximation. For 0 levels a target bit rate in the order of 4 bits per pixel, for 1 level a target bit rate of 2.5 bpp, for 2 levels a target bit rate of 1.5 bpp, and for levels greater than 2 a target bit rate of 1 bpp, is preferably required for reasonable reconstructed image quality. Thus in reconstructing an image at a reduced resolution reconstructing the resolution at a rate greater than the rates given by these rules of thumb will usually give a quality greater than required.

3.0 Overview of the Implementations

An overview of the first, second, third, fourth, fifth, and sixth implementations is now described with reference to FIG. 8, but is not limited thereto.

The method 800 commences 805 and any necessary variables are initialised the image data is input. Preferably, the input image data is in the form of a part 1 or part 11 compliant JPEG2000 coded data, or pixel data of an original image.

In Step 810 an output resolution R is determined. This output resolution R may be selected by a user or automatically selected by a software application requesting a reconstructed image. The output resolution may depend on, for example, a desired display resolution, or a desired compressed image size. In Step 820 a number of sub-passes to extract from each block code is determined based on the resolution. The number of sub-passes to be extracted may vary for each block code. The number of sub-passes may be determined, for example, by simply extracting all layers except the least significant layer of the image. In this case the number of sub-passes to be discarded for a given block code is equal to the number of sub-passes of the block code that are in the least significant block layer.

The determined sub-passes are then extracted in Step 830, and the remaining sub-passes that are not relevant to the desired output resolution are discarded. Different procedures for extracting sub-passes of the code-blocks are discussed in sections describing each of the first, second, third, fourth, fifth, and sixth implementations.

In Step 840 the reduced resolution image is reconstructed from the remaining block codes. Throughout this specification, unless contrary intentions appear, the term "reconstructed" includes both the case where the image pixel data is decoded or a compressed domain image code is generated such as in a transcoding process. For example, reconstruction may involve decoding the compressed block codes with the usual JPEG2000 decoding procedure and displaying the reduced resolution image. Alternatively reconstruction may involve forming the block codes into a valid JPEG2000 compressed image codestream (representing the reduced resolution image), for transmission, storage, or other purposes. The method 800 then terminates at step 860.

The second implementation is concerned with encoding, whereas the first and third implementations are concerned with transcoding/decoding respectively. Specifically, the second implementation comprises a method of encoding an original image to provide a JPEG2000 codestream. Whereas, the first implementation comprises a method of transcoding a JPEG2000 codestream, where the JPEG2000 codestream has been preferably produced by the second implementation, to provide a JPEG2000 codestream at a reduced resolution. Furthermore, the third implementation comprises a method of decoding a JPEG2000 codestream, where the JPEG2000 codestream has been preferably produced by the second implementation, to provide a reduced resolution of the original image.

As will become apparent from the following description, the aforesaid method of encoding an original image to provide a JPEG2000 codestream, enables the transcoder and decoder, such as in the first and third implementations having to do minimum work when decoding/transcoding such a JPEG2000 codestream.

The fourth implementation is a further variation of the second implementation to further reduce the transcoder and decoder complexity by providing explicit instructions for reconstruction in terms of a sequence of byte range reads and concatenations using standard (JPEG2000) file format mechanisms.

The fifth implementation is a further variation of the first implementation, where a JPX file, preferably constructed in accordance with the fourth implementation, is transcoded to produce a reduced resolution JP2 or JPX file.

The sixth implementation is a further variation of the third implementation, where a JPX file, preferably constructed in accordance with the fourth implementation, is decoded to produce a reduced resolution of the original image.

4.0 First Implementation

As mentioned above, for colour image compression, assuming sufficient DWT levels are used, at 1 bit per (monochrome) pixel (that is a compression ratio of 8 to 1) typically provides good image reconstructed image quality. For reconstructing an image at the lowest resolution, resolution 0, a target bit rate in the order of 4 bits per pixel is preferably required, for resolution 1 2.5 bpp, for resolution 2 1.5 bpp, and for resolutions greater than 2 1 bpp for reasonable reconstructed image quality. Thus in reconstructing an image at a reduced resolution, reconstructing the resolution at a rate greater than the rates given by these rules of thumb will usually give a quality greater than required. If this is the case it is possible to discard some of the bit-planes (or sub-passes) while achieving an acceptable reconstructed image quality. In general, for a fixed perceptual quality, the target bit rate is a function of the resolution.

The construction of quality layers in JPEG2000 can be performed in a semi arbitrary fashion. That is block layers may have an arbitrary number of coding passes (from 0 to three times the number of bit-planes suggested by the quantization step size). Thus in layer 0 some blocks may have all their coding passes, while others have none. However, it is expected that usually layers will be constructed for increasing (original) image quality. Hence discarding layers is similar to using JPEG2000 coded with an effective larger step size and the rules of thumb bit rates given above should provide reasonable image quality.

Figure 6A:
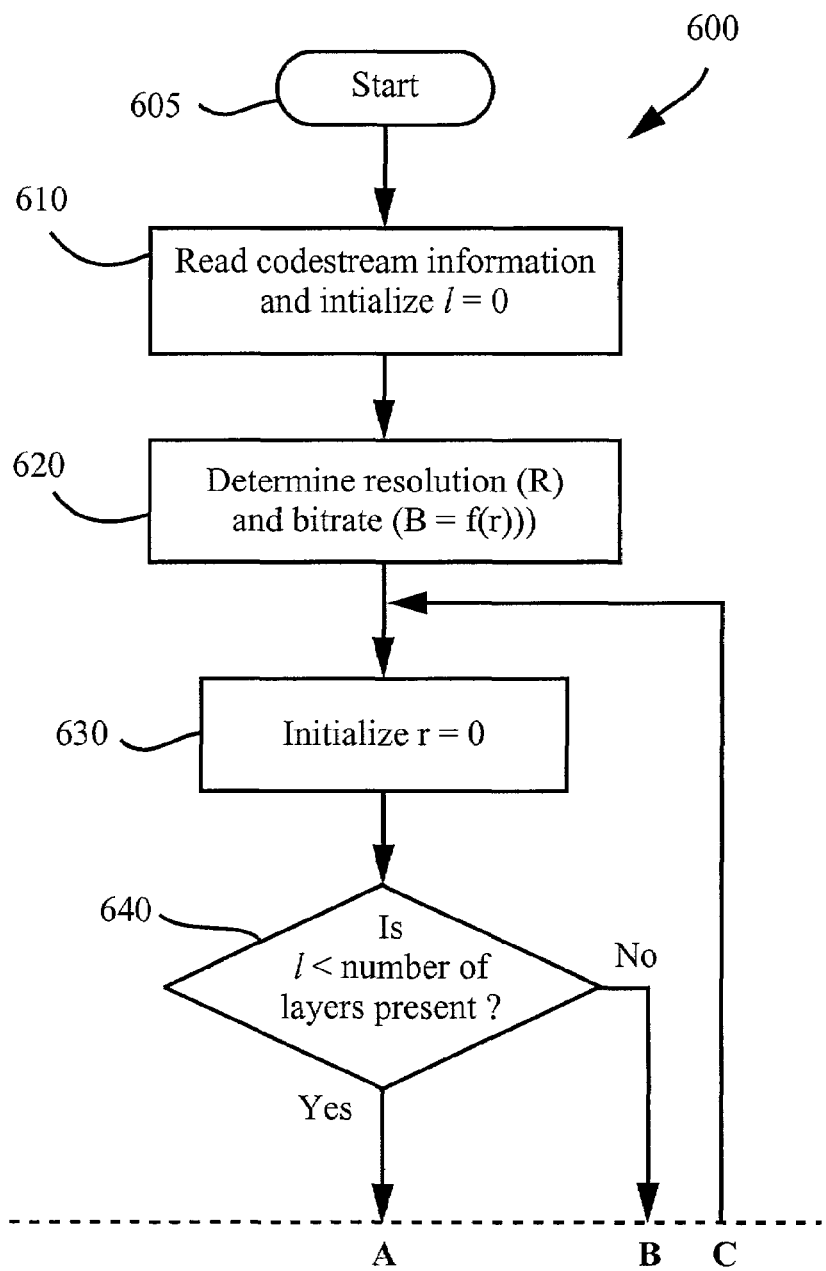
FIGS. 6A, 6B, and 6C shows a flow chart of a method of transcoding a JPEG coded representation of an original image to provide a JPEG coded representation of a reduced resolution of the original image in accordance with a first implementation.
Figure 6B:
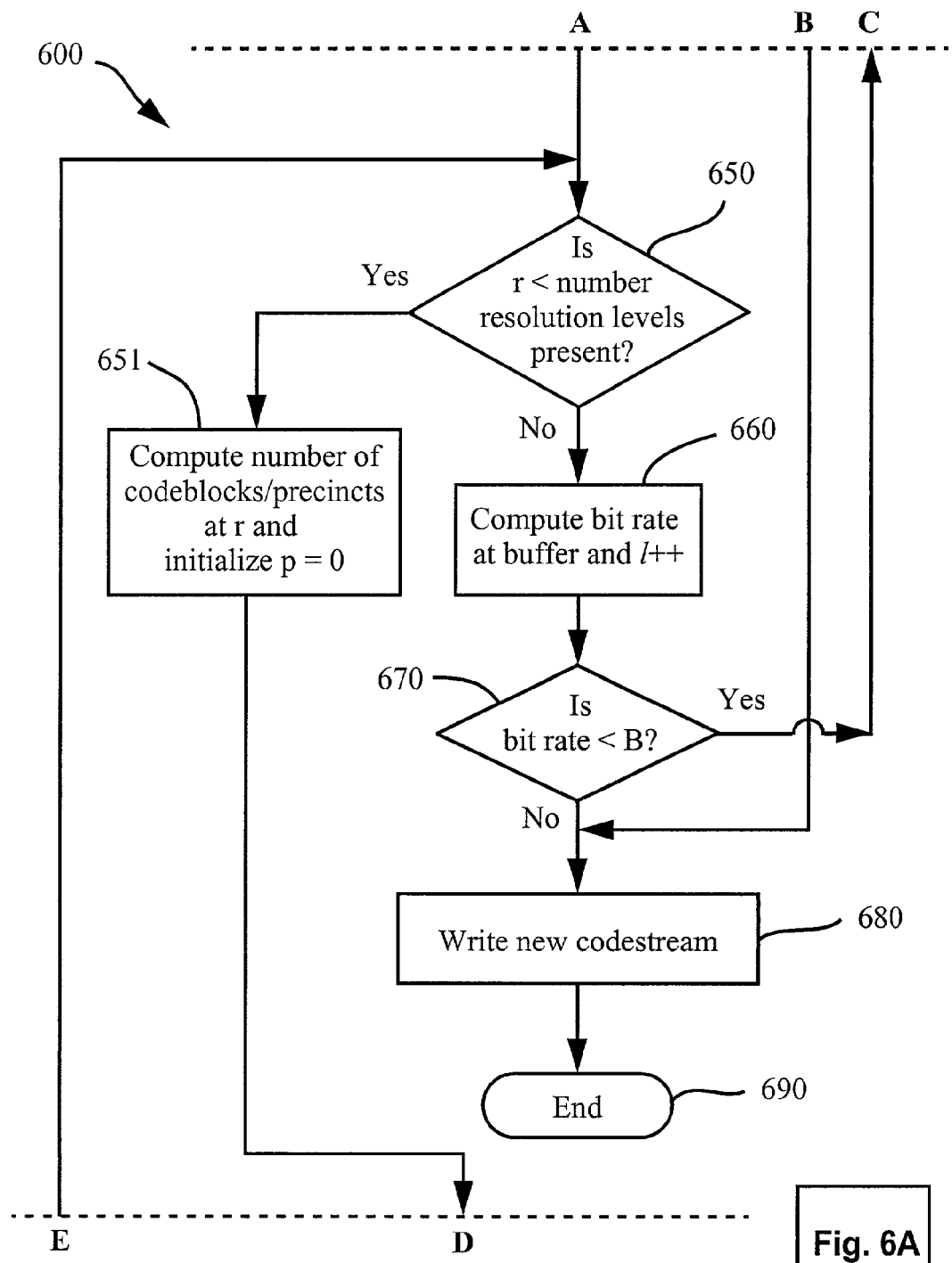
Figure 6C:
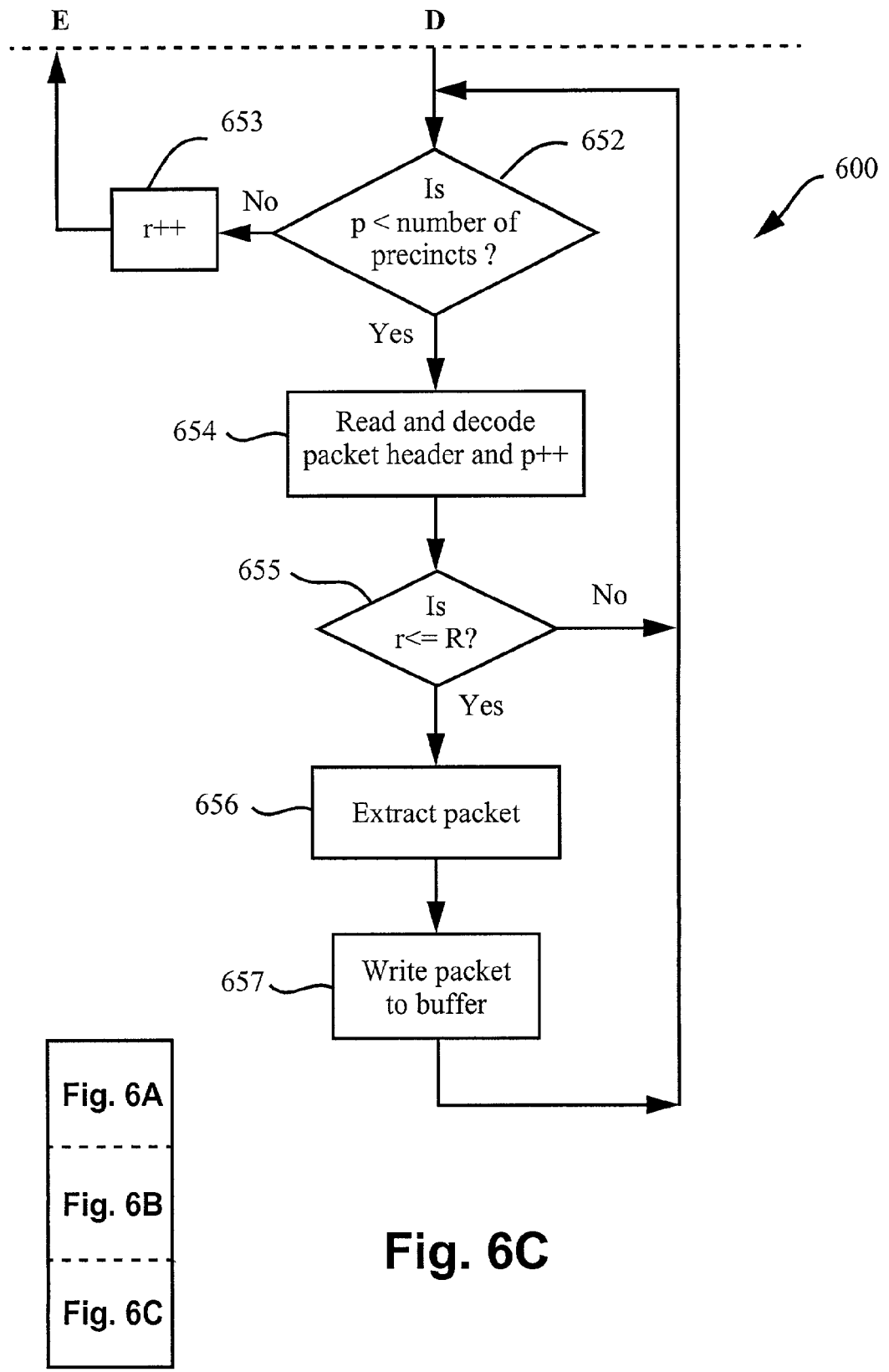

FIGS. 6A, 6B, and 6C shows a flow chart of a method 600 of parsing out a lower resolution version of a JPEG2000 compressed image at the packet level, extracting enough layers to give the lower resolution image an approximate fixed bit rate. The method shown in FIGS. 6A, 6B, and 6C takes as input a JPEG2000 codestream of an original image with packets arranged in 'layer-resolution level-component-position' (lrcp) progression. Preferably, the method fully parses the input JPEG2000 codestream upto a termination point and outputs a new JPEG2000 codestream containing only those packets necessary for the reconstruction of a selected reduced resolution of the original image. The method 600 commences at step 605, where the codestream is input. In Step 610, the codestream header is read where relevant information such as (i) image size, (ii) number of DWT levels, (iii) codeblock size, (iv) precinct size and (v) number of layers present, is extracted. The information is necessary for decoding packet headers and also for determining the number of codeblocks and precincts present in each resolution level. In Step 610, a 'layer counter' variable l is initialised to 0 for use later as a test condition in Step 640. Also in step 610, the number of layers present in the input codestream is determined. In Step 620, a resolution (R), and a target bit rate (B) for a selected reduced resolution level is determined. The selected resolution may be selected by a user or may automatically be selected in response to a request from a software application, such as a browser. A resolution of R equals zero corresponds to reconstructing the image at the lowest resolution level, and R equals one corresponds to reconstructing the image at resolution level one and so on for other R values. The target bit rate is a function of resolution level, ie. B=f(r) in 620. Preferably, the target bit rate for resolution 0 is 4 bpp, the bit rate for resolution 1 is 2.5 bpp, the bit rate for resolution 2 is 1.5 and the bit rate for resolution greater than 2 is 1 bpp. In Step 630, a 'resolution counter' variable, r, is initialised to 0. The resolution counter variable, r, is used later for controlling a block of recursive steps, where r equals zero corresponds to the lowest resolution level ie. the LL DC subband.

In Step 640, a test is carried out to determine if counter l is less than the number of layers present, where the number of layers was determined earlier in Step 610. If Step 640 is tested positive (ie. yes), another test, 650, is carried out to determine if r is less than the number of resolution levels present. The number of resolution levels present is one more than the number of DWT decomposition levels used to construct the compressed codestream. If Step 650 is tested negative, the bit rate at the output buffer is computed in Step 660. Initially, the bit rate at the output buffer would be 0 as there are no packets written to the buffer yet. However as more packets are written to the buffer, the bit rate increases. The bit rate is computed by dividing the number of bits in the buffer by the size of the reduced image corresponding to r. Also, in Step 660, l is incremented by one.

In Step 670, the bit rate at the buffer is tested. If the bit rate is less than B, where the value of B is dependent on r, the processing returns to Step 630 to extract the next layer. However, if the bit rate is greater than B, Step 680 writes a new codestream to file skipping remaining block layers. The new codestream consists of the extracted packets in the buffer and a new codestream header. Similarly, if Step 640 is tested negative (ie. no), it indicates that there are no more layers to extract, hence Step 680 is executed to write the new JPEG2000 codestream. In most instances, the method is able to simply write a new codestream header. After step 680, the method terminates 690.

If Step 650 is tested positive, the number of codeblocks and the number of precincts at resolution corresponding to r are computed in Step 651. The number of codeblocks is needed for decoding the packet headers at resolution level r, and the number of precincts corresponds to the number of packets at resolution level r. In Step 651, a 'precinct counter' variable p is initialised to 0, where p is used to control a block of steps to extract packets. In Step 652, a test is carried out to check if p is less than the number of precincts at resolution r. If Step 652 is tested positive, then the packet header is read and decoded in Step 654. Initially, this would be the first packet at resolution r, but, as p is incremented, Step 654 would be reading the next packet. Also, in Step 654, p is incremented by one. After the packet header is decoded, a test is performed in Step 655 to determine if r is less than or equal to R. If the test is positive, the packet (both packet header and packet body) is extracted in Step 656. The extracted packet is copied to the output buffer in Step 657. The processing then returns to Step 652. If Step 655 is tested negative, this means that r has exceeded the desired reduction resolution level, so packets in the higher resolution levels are discarded. The processing returns to Step 652 where packets headers in the higher resolution levels are read and decoded to determine the position of the next packet, but are not extracted nor copied to the buffer. If Step 652 is tested negative, r is incremented by one in Step 653. The processing then returns to Step 650.

Note that FIGS. 6A, 6B, and 6C applies to compressed codestreams with packets progressed in 'layer-resolution level-component-position' order, where layer is the dominant parameter. Alternatively, the method may take as input JPEG2000 codestreams arranged in other progression orders. With other progression orders such as the resolution dominant rlcp (resolution level-layer-component-position), packets are extracted for each resolution level (from r equals to 0 to r equals to R), for each layer (from l equals to 0), for each component, for each precinct (from p equals 0 to p equals to the number of precincts in r), until the target bit rate, B, corresponding to R have been reached. For other progression orders, packets are extracted in a similar fashion until the target bit rate have been reached. Preferably, the target bit rate functions referred to in step 620 are an example of bit rate values used for compressed colour images to achieve good reconstructed reduced resolution image quality. For greyscale compressed images, the bit rates are preferably, 4.5 bpp for r equals zero, 3.5 bpp for r equals one, 2.5 bpp for r equals two and 2 bpp for r greater than two levels. For compressed images containing multiple components, ie. three components for RGB colour images as opposed to a single greyscale image component, Steps 650 through to Steps 657 are repeated for each component.

5.0 Second Implementation

It would be convenient to extract a lower resolution image at a reasonable quality with the decoder or parser having to do minimum work. A method of encoding is now described with reference to FIG. 4. In this implementation, the method takes as input an original image and encodes the image to output a JPEG2000 codestream of the original image with packets arranged in 'layer-resolution level-component-position' (lrcp) progression, and preferably quantised according to the JND table B. The output of the second implementation is suitable to be used as the input to the first implementation. Though the first implementation is not limited in taking this as input. It may take other forms of JPEG2000 coded images.

Preferably the image is encoded according to the JPEG2000 standard with relevant parameters described as follows. The method 400 commences at step 405, and an input image is transformed with a 5-level DWT in Step 410, using the 9/7 irreversible filters. Each subband is quantized with a step size given by the above JND quantization table in Step 420. In Step 430 quantized subband code-blocks are entropy encoded, according to the JPEG2000 entropy encoding method. Nominally each code-block is coded with 6 quality layers, although some of these block layers may be empty (that is contain no coding passes). Block layer 0 corresponding to quality layer 0 (the coarsest layer) is empty for all code-blocks not in the LL5 subband—that is code-blocks at resolutions higher than 0. Block layer 0 for code-blocks (ie those in the LL5 subband) consist of the coding passes that approximate the quantization step size for the LL0 subband according to the JND quantization table, which is 5. Since this step size is approximately 4 times that of the actual quantization step size of 1.2589 (for the LL5 subband), all but the least two significant bit planes (usually 6 coding passes) are included in block layer 0.

Block layer 1 is empty for all code-blocks in resolutions greater than 1. Block layer 1 for blocks in the LL5 subband consists of a number of extra coding passes (not included in block layer 0) necessary to refine the code-blocks from the effective quantization step size at block layer 0 (a step size of 5) to an effective step size of that given in the JND quantization table for the LL subband level 1, which is a step size of 3.5. (This is because when decoding at a resolution of 1 the LL5 subband becomes a LL1 subband). This is a reduction in quantization step size of about 1.4, which can be effected by including one or two extra coding passes. Preferably two extra are used. Block layer 1 for the resolution 1 code-blocks is constructed in a similar manner to block layer 0 for the blocks in the LL5 subband. That is only those coding passes that are required to approximate the quantization step sizes given for the subbands at level 1 in the quantization table are included in block layer 1. For example for the HH subband (originally at level 5), a quantization step size of 24.5784 is desired for decoding at resolution 1. The HH subband (at level 5) was quantized with a step size of 1.3709, which is approximately 16 (17.9) times smaller. Thus all but the least significant 4 bit-planes of the HH subband are included in block layer 1 for the HH5 subband code-blocks. The block layer construction continues in a similar manner for all code-blocks in other subbands in the image. Code-blocks in resolutions greater than l make no data contributions to block layers 0, 1, . . . , l. That is these block layers for these codeblocks are empty.

In this way, block layer 0 at resolution level 0 contains all the data necessary for reconstructing the image resolution 0 at a just visually acceptable quality. Block layer 1 at resolution level 1 together with block layers 0 and 1 at resolution level 0 contain all the data necessary for reconstructing the image resolution 1 at a just visually acceptable quality. Similarly, Block layer 2 at resolution level 2, together with Block layers 1 and 2 at resolution level 1, and Block layers 0, 1, 2 at resolution 0 contain all the data necessary for reconstructing the image resolution 2 at a just visually acceptable quality. And so in similar fashion for reconstructing the image at higher resolutions at acceptable quality.

In Step 440 a loop is entered that iterates over layers l=0, 1, . . . , 5 for constructing the JPEG2000 codestream with packets arranged in layer-resolution level-component-position (lrcp) progression. In Step 450 layer l is formed from the compressed code-blocks contributions at resolution 0, 1, . . . , l. That is layer l is formed from the block-layer l from code-blocks at resolutions 0, 1, . . . , l. Code-blocks at resolutions higher than l have zero contribution to layer l, since they have a zero contribution to block layers 0, 1, . . . , l. Upon termination of the layer loop, processing continues at Step 460 where the compressed image is output with appropriate header information.

In a variation of the second implementation other numbers of DWT levels can be used. In this case for S DWT levels there are preferably S+1 layers. The first layer contains the data necessary for reconstructing resolution 0 at an acceptable quality, the second layer resolution 1 etc. The process depicted in FIG. 4 may also be implemented in a pipeline fashion, wherein the DWT, quantization, and entropy coding processes are all interleaved. Colour images may also be compressed in this manner. In this case there are typically three colour components R, G and B, which are preferably transformed using the JPEG2000 irreversible colour transform prior to the DWT, resulting in a Y, CB and RC component. The Y component is separately transformed using preferably a 5-level DWT, while the chrominance components (CB and RC) are transformed using a 6-level DWT. The layering then follows according to FIG. 4 wherein layer l contains the code-blocks for resolution l1 for each of the components. There is one final extra layer, giving 7 layers, which contain the code-blocks from the chrominance components at resolution 6. In this way, each layer contains the Y component at twice the effective resolution as compared to the chrominance components, which is a commonly used strategy with other compression methods such as JPEG.

In a further variation of the second implementation the JPEG2000 reversible 5/3 filters are used (along with the reversible colour transform). Each block is not quantized. However, for the purposes of the block-layer construction, each layer is formed as described above by including those passes necessary to approximate the quantization given by the JND quantization table B at the desired resolution. Furthermore there is one extra layer, and hence one extra block layer for each code-block. Namely the last block layer is the remaining coding passes required to represent the code-block losslessly, that have not been included in the representation of the block corresponding the smallest quantization step size. The final, additional layer, thus consists of all such final block-layers.

An alternate form of the first implementation can be employed that follows a similar method of determining quality to that of the second implementation. In this case resolution layers are kept until each code-block within the resolution has an effective quantization step size as determined by the JND quantization table at the desired resolution level. The effective quantization step size is determined by the number of coding passes and the number of insignificant most significant bits. This later information is contained in the packet headers, and is decoded as part of the packet parsing process.

Other quantization tables can also be employed. For example a quantization table with entries twice that given in the JND quantization table could be used if more compression was desired. Further, the ratios of the quantization table entries could be different, and also the block-layer partitioning strategy, that includes only those bit-planes required to meet a given quantization step size. In a further variation, rate distortion methods could be used to minimise the rate for a given resolution for some given quality level.

6.0 Third Implementation

Figure 5:
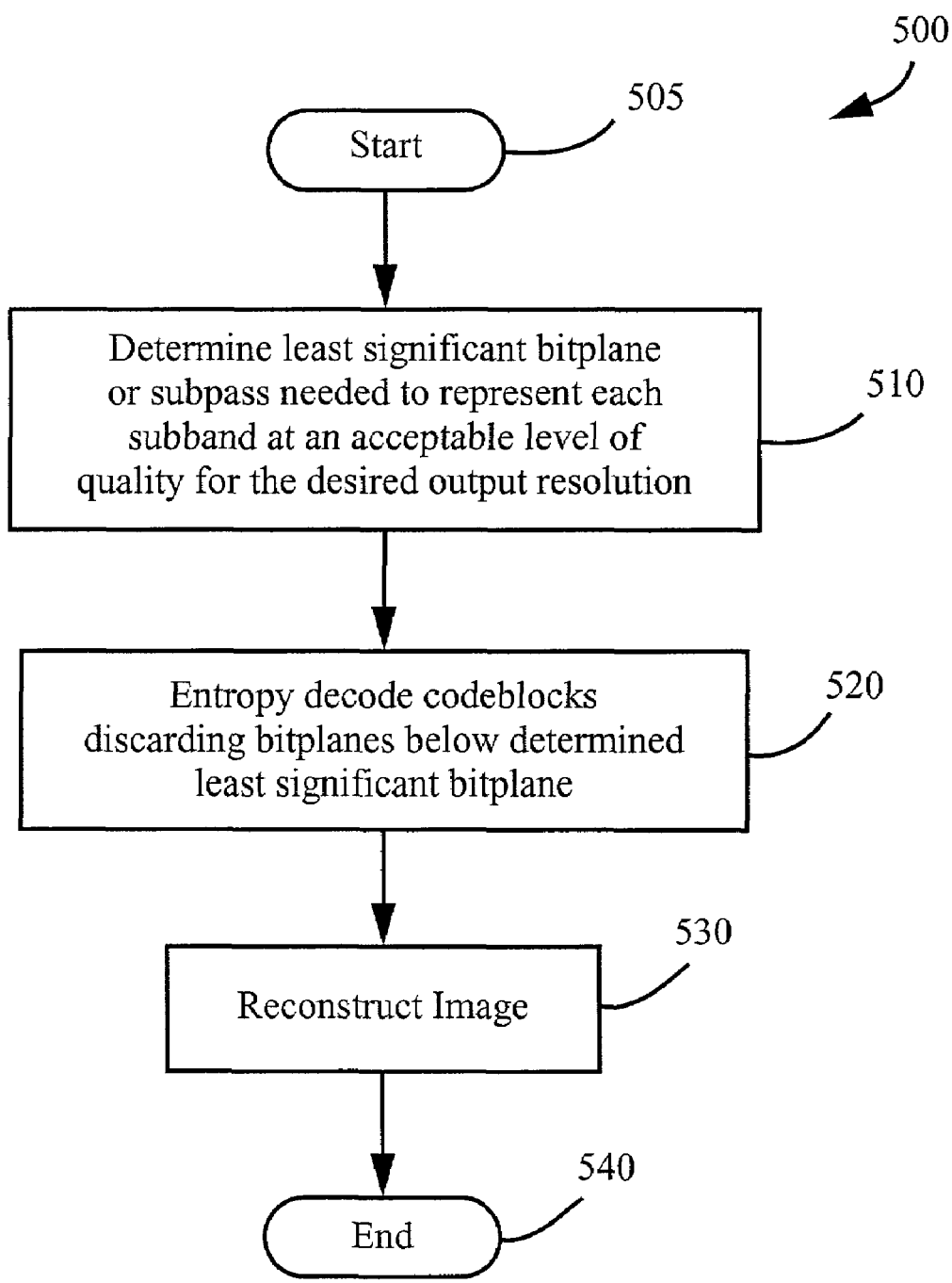
FIG. 5 shows a flow chart of a method of decoding a JPEG2000 coded representation of an original image to provide a reduced resolution of the original image in accordance with a third implementation.

When decoding an image at lower resolution, the principle of discarding least significant bit-planes at lower resolution can be applied to images that are not coded as JPEG2000 codestreams with packets arranged in 'layer-resolution level-component-position' (lrcp) progression. A method of decoding is now described with this goal in mind, with reference to FIG. 5. The decoding method takes as input a non-layered JPEG codestream and outputs a reduced resolution of the original image.

The method 500 commences at step 505 where the non-layered JPEG codestream is input for processing. In next Step 510, the least significant bit-plane (or a sub-pass) thereof is determined, for each subband, in order that the subband be represented with an acceptable level of quality for the given output resolution. Preferably this least significant bit-plane is determined so that the effective quantization is less than or equal to that given by JND quantization table. However other strategies may also be used, such as discarding remaining bit-planes when a distortion metric falls below a given threshold. In Step 520 the code-blocks are entropy decoded, discarding the bit-planes below the determined least significant bit-planes. Discarding is simply achieved by terminating the decoding process after decoding the last kept sub-pass. The next compressed code-block segment can be determined from the compressed code-block length information contained within the relevant packet header. In Step 530 the image is reconstructed by performing the inverse DWT, and inverse component transform, if used, and other such reconstruction operations. The method terminates at step 540.

7.0 Fourth Implementation

Due to the complex layered structure of the JPEG codestream, codestream parsing is generally more complex than file level parsing. We consider the kind of codestream rewriting that would be required in order to extract a reduced size image from a JPEG2000 codestream to exemplify this. Image size information is contained in the SIZ marker, which must be rewritten during parsing. Coding information including the number of levels of decomposition is contained in COD and COC markers, denoting codestream defaults and component specific overrides respectively. The relevant fields of these markers must be rewritten during transcoding. The quantisation tables are contained in the QCD and QCC markers—again denoting codestream defaults and component specific overrides respectively. The JPEG2000 standard specifies that the length of these markers is a function of the number of levels of decomposition so any reduction in resolution will also require a transcoder to rewrite these markers.

As the bitstream is to be truncated then the contents of any PLM and PPM markers will also need to be rewritten. In addition, unless SOP (start of packet header markers are used, the bitstream contained in the PPM marker will need to be decoded in order that the byte ranges of the required segments can be determined. The order of bitstream headers in these markers is determined by information in the COD and COC markers and optionally modified by the content of any POC marker. This same ordering information is also required by a transcoder in order to rewrite any PLM and recalculate and write and TLM marker present in the main header. Any POC marker itself may need to be rewritten to account for the removal of certain parts of the bitstream. The SOC, RGN, CRG and COM markers can be rewritten without modification.

The problem then is that the remainder of the codestream comprises a sequence of tile parts. A set of tile parts comprises the code for a single tile of image data and each tile has its own header in which overrides for the previously COD, COC, QCD, QCC, POC, can be placed. This fact alone has serious implications for the complexity of parsing. In particular, as it is not possible to determine from a codestream (main) header the existence of tile overrides, the entire codestream often must be processed during transcoding. Further, if one or more image tiles have a different number of resolution levels or quality layers to other tiles then it may not be possible to fulfil certain resolution reduction requests without complete re-encoding. Again however, this cannot be determined without full parsing of the codestream.

This exposition, while not comprehensive of the problems in parsing JPEG2000 codestreams serves to indicate at least that it is not a straightforward task, potentially requiring complex rewrites of distributed headers as well as complete parsing of the codestream. Importantly, the standard itself provokes as many questions as it provides answers on the issue. The most outstanding issue being that there is no way of determining, without full parsing, exactly what transcoding of a JPEG2000 may yield.

The present implementation provides a structure for a JPEG2000 file and codestream that minimises the software complexity of an image server that is responsible for transcoding the images it servers for different resolution clients. Whilst the present implementation has specific application to the parsing of different resolutions, it has a more general application to the parsing of different parsed forms of a single JPEG 2000 codestream that appear as distinct composition layers. For the ease of explanation, the implementation will be described with reference to the parsing of different resolutions.

In this implementation, to assist in the dynamic parsing of image content to a requested resolution, a server stores image data in a predetermined format which is a well behaved subset of the JPEG2000 compression standard. Well behaved images may be obtained by initial parsing of source JPEG2000 image files either by an image creation program, html editing program, a publishing program used to transfer the image data to a server, a translating processor that is run periodically on image files by the server or similar. The specific format is specified as follows.

7.1 File Construction

In the fourth implementation, the codestream is stored using a JPX file wrapper. The aim of using a JPX file format is to maintain a standard compliant file structure that may be used and potentially generated by applications external to those specifically involved in the client server image transfer. While JPX is defined as part of the JPEG2000 standard, like the codestream, few recommendations are provided and the file format extensions are provided more as a collection of tools than a specific solution technology.

The construction of a JPX file in accordance with the present invention is described with reference to FIG. 9. The codestream, constructed as described above is contained in a contiguous codestream (jp2c) box (9070) within the file (9000). The file (9000) is, in accordance with the JPEG2000 standard, headed by a signature box (9010) (which is identical for all part I and part II files). The file type box (9020) contains in its data segment the following comma separated sequence of characters (non alphanumeric characters are written in the form \xxx where xxx is the octal ascii code value of the character)

j, p, x, \040, 0, 0, 0, 0, j, p, 2, \040 which indicates that this file is an extended JPEG2000 file (jpx) which is constructed to be compatible with the jp2 specification. The reader requirements box (9030) shall contain FUAM and DCM fields constructed in accordance with the standard to include at least the following standard feature flags (other requirements are dependent on the actual image data; whether it contains opacity information; its colour space; etc.) in the following table C:

TABLE C

| Flag | FUAM | DCM | Explanation |
|---|---|---|---|
| 2 | X | | Contains multiple composition layers |
| 12 | X | X | Codestream is contiguous |
| 13 | X | | Codestream is fragmented and all fragments are in file and in order |
| 19 | X | | Multiple discrete layers that should not be combined |
| 20 | X | | Compositing layers each contain only a single codestream |
| 22 | X | | All compositing layers are in the same colour space |
| 63 | X | | Composition layers have labels |
| 64 | X | | Codestreams have labels |

Optionally the file may contain a single vendor feature specifying that it contains multiple resolutions of the same image. At the time of writing the reader requirements were not fully mature in the standard. However, the intention herein is to indicate to a (JPX) reader that the minimum functionality required to fully decode the image data contained in the file is the ability to decode a single contiguous codestream (plus any colour space and metadata flags that are additionally specified for the particular image) and that to fully understand all aspects of the file the reader must additionally have the ability to understand files that contain multiple layers (but comprise only single codestreams and may be displayed without compositing using the same colour space), codestreams that are fragmented (but all fragments are contained in the file and appear in order) as well as contiguous, and codestreams and layers that are labelled.

The JP2 header box (9040) contains the file level header information for the full image stored in this file. In particular it minimally contains an image header box which specifies the height and width (in pixels) of the image corresponding to a complete decode of the codestream (contained in the contiguous codestream box). The jp2 header box should also contain the required colour specification box(es) (9043) and resolution specification box (9044). In the fourth implementation, the jp2 header box also contains a label box that identifies the size and (or) intended output device resolution or class targeted by this image size. In the FIG. 9, the example label "3072×2048" is given which corresponds to the image dimensions in pixels. Other examples would include "300 dpi" or "print", "screen", "preview", "thumbnail". This label provides a hook by which the user of the image data may select the particular resolution he or she wants to deal with and so it should be meaningful within that context. Header information in the JP2 header box is uniquely associated with the codestream in the contiguous codestream box by a standard JP2 reader. A JPX reader on the other hand will treat the contents of the JP2 header box as a set of default headers for all the codestreams and codestream equivalents it finds in the file.

Following the jp2 header box there are one (1) or more sets of boxes each comprising a virtual codestream (9050). Each of these contains a codestream header box (9051) a media data box (9053) and a fragment table box (9054). Each virtual codestream corresponds to a particular resolution of the image data contained in the file. Header fields contained in the codestream header box (9051) override any corresponding fields in the JP2 header box for the corresponding codestream. Minimally the codestream header box will contains overrides for the label and image header (9042) contained in the JP2 header box (9040). The media data box (9053) contains some additional codestream fragments corresponding to those sections of the codestream that need to be changed in order to yield a lower resolution version. The contents of the media data box in the implementation is outlined in detail in the section herein entitled "format of the codestream difference data". Finally the fragment table contains a single fragment list box (9055). A JPX compliant reader will treat the fragment table as a codestream equivalent, constructing the decoder input according to the sequence of references contained therein.

All other header boxes that may optionally be included as part of a JPX file and do not influence the reconstruction of the image data (eg. Metadata in XML boxes) are included after the contiguous codestream box.

7.2 Codestream Construction

The codestream is constructed in complete compliance with part I of the JPEG2000 standard with a number of slight additional constraints: These constraints are preferably:

1. No POC (progression order change) markers are permitted.

Although the core of this implementation applies to the particular application of file level mechanisms, these are made more optimal by careful selection of codestream structure. In particular, careful selection of codestream structure allows us to minimise the number of fragments in each reduced resolution image. In addition, we can use our file level mechanisms to improve the basic scalability of the JPEG2000 codestream by eliminating the need to replace un-needed quality levels with empty packets at low resolutions. This kind of optimisation is not possible using simple truncation of the codestream. The following additional constraints define the codestream structure for the present implementation.

Figure 14:
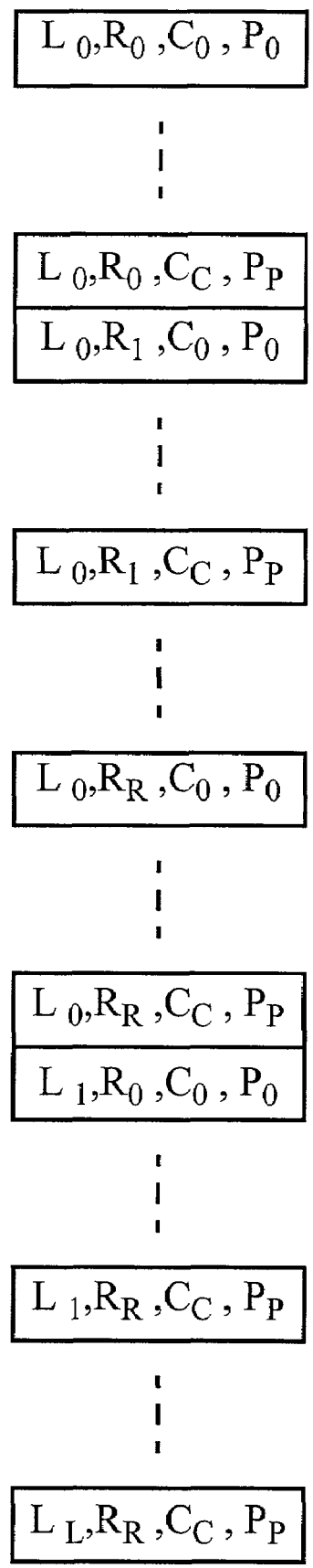
FIG. 14 illustrates the packet order in a layer-resolution level-component-position progression according to the JPEG2000 standard (part 1)

1. The image is encoded as a single tile in LRCP (layer, resolution, component, position) order, precincts are used to implement a spatial constraint on the encoded data sets. This order is depicted in FIG. 14

2. The codestream layers are constructed in such a way that, for any given resolution level r, reconstruction of the first l layers where r=l, will yield an image with identical effective perceptual quality. This quality is determined at encode time by the "target" bit rate for the full image and is application dependent. The method for constructing such a codestream is outlined herein in sections entitled "Second implementation"

3. There are either NR or NR+1 layers (where NR is the total number of resolutions contained in the codestream) constructed such that layer l=NR+1 when present, contains all of the information required to restore the highest quality available for the image. This may correspond to lossless—in the case where the lossless JPEG2000 compression mode has been used—or other suitable quality.

4. If Packed packet headers are included then it is preferable to include them in their tile-part based, PPT form. That is, one PPT marker should appear in every tile part and include the packet headers for all packets in that tile part.

5. If Packet length markers are included then it is preferable to include them in their tile-part based, PLT form. That is, one PLT marker should appear in every tile part and include the packet headers for all packets in that tile part.

6. RGN markers are not used as their function can be achieved using layers more effectively across a wider range of readers The preferred codestream structure is further described through the following example of a 1280×960 image encoded with 4 resolution levels and a target bit rate of 1 bit per pixel for the full resolution image. The number of bits contained in the codestream up to and including the corresponding layer is as follows (Table D):

TABLE D

| Resolution | Layer | Reconstructed image size | Effective bit rate | Number of bits |
|---|---|---|---|---|
| 0 | 0 | 80 × 60 | 4 | 19,200 |
| 1 | 1 | 160 × 120 | 2.5 | 48,000 |
| 2 | 2 | 320 × 240 | 1.5 | 115,200 |
| 3 | 3 | 640 × 480 | 1 | 307,200 |
| 4 | 4 | 1280 × 960 | 1 | 122,880 |
| "4+" | 5 | 1280 × 960 | 1 | >122,880 |

The image code is divided into tile parts such that these reduced resolution subsets can be extracted as contiguous chunks from the file as depicted in Table E:

TABLE E

| Part | First packet | | | | Last packet | | | | Contained in resolution: | | | | | |
|---|---|---|---|---|---|---|---|---|---|---|---|---|---|---|
| Num. | L | R | C | P | L | R | C | P | 0 | 1 | 2 | 3 | 4 | "4+" |
| 0 | 0 | 0 | 0 | 0 | 0 | 0 | $N_c$ | $N_p$ | X | X | X | X | X | X |
| 1 | 0 | 1 | 0 | 0 | 1 | 1 | $N_c$ | $N_p$ |   | X | X | X | X | X |
| 2 | 1 | 2 | 0 | 0 | 2 | 2 | $N_c$ | $N_p$ |   |   | X | X | X | X |
| 3 | 2 | 3 | 0 | 0 | 2 | 3 | $N_c$ | $N_p$ |   |   |   | X | X | X |
| 4 | 2 | 4 | 0 | 0 | 2 | 4 | $N_c$ | $N_p$ |   |   |   |   | X | X |
| 5 | 3 | 0 | 0 | 0 | 3 | 3 | $N_c$ | $N_p$ |   |   |   | X | X | X |
| 6 | 3 | 4 | 0 | 0 | 3 | 4 | $N_c$ | $N_p$ |   |   |   |   | X | X |
| 7 | 4 | 0 | 0 | 0 | 4 | 4 | $N_c$ | $N_p$ |   |   |   |   | X | X |
| 8 | 5 | 0 | 0 | 0 | 5 | 4 | $N_c$ | $N_p$ |   |   |   |   |   | X |

7.3 Format of the Codestream Difference Data

For each virtual codestream in the JPX file there is a media data box containing the codestream difference data. This data captures the differences, principally in headers, between the full encoded codestream and a codestream representing a reduced resolution. It is structured to be both minimal, so as not to introduce unnecessary redundancy in the file and to minimise the number of distinct segments that must be spliced together in order to reconstruct the reduced resolution codestream. Its format is described in detail with reference to FIGS. 13A, B and C.

The media data box always starts with the required subset of the sequence of header markers (16200) that start a valid JPEG2000 codestream. The Xsiz, XTsiz, Ysiz and YTsiz fields of this SIZ marker differ from those of the SIZ marker in the full codestream. The COD and COC markers have different values for their number of layers, number of decomposition levels and the number of listed precinct sizes is also reduced to match the reduced number of resolution levels available in the reduced codestream. The QCD and optional QCC markers are truncated in length to reflect the reduced number of decomposition levels. RGN and POC markers are not used. If packed packet headers (PPT) and packet length (PLT) markers are included in the codestream they are included in the main header at this point by reference. The referencing process concatenates the body sections of the multiple tile PPT and (or) PLT markers into their main header equivalents-PPM and PLM. The process is described in greater detail with reference to FIGS. 13B and 13C.

For the PLM marker (13000), the marker contents are divided into two sections along the line depicted (13100). The header part (13110) includes the PLM marker value and the Lplm and Zplm fields, which must be rewritten as appropriate to match the set of packets included in this particular virtual codestream. This rewritten portion is what is stored in the codestream difference data. The trailing part (13120) is not included in the codestream difference data but referenced from the codesteam proper. That is, there is one or more fragment pointers pointing to this information in-situ in the tile-part headers of the main codestream. This is possible because the Iplt (of the tile part marker) and Iplm fields (required by the main marker) have identical format. The structuring of the codestream into tile parts ensures that the trailing section of the PLM marker can be composed using references to the whole bodies of PLT markers.

For the PPM marker (13500), the marker contents are divided into two sections along the line depicted (13600). The header part (13610) includes the PPM marker value and the Lppm and Zppm fields, which must be rewritten as appropriate to match the set of packets included in this particular virtual codestream. This rewritten portion is what is stored in the codestream difference data. The trailing part (13620) is not included in the codestream difference data but referenced from the codesteam proper. That is, there is one or more fragment pointers pointing to this information in-situ in the tile-part headers of the main codestream. This is possible because the Ippt (of the tile part marker) and Ippm fields (required by the main marker) have identical format. The structuring of the codestream into tile parts ensures that the trailing section of the PPM marker can be composed using references to the whole bodies of PPT markers.

Immediately after this there is a sequence of markers and marker parts which correspond to the tile part header. In this implementation this comprises a single SOT, SOD pair for each tile part appearing in the virtual codestream. In this implementation there is a single SOT, SOD pair as there is a single tile part in each virtual codestream. By way of explanation, the division of the main codestream into tile parts is used to provide a more coherent joint file and codestream structure as each fragment in each virtual codestream corresponds to a complete tile part in the full codestream. The use of tile parts in the main codestream also improves the locality of reference to codestream header segments in the case where PPT and PLT information is included in the codestream. The division of the codestream into tile parts is mainly of benefit when packet length markers and (or) packet packet header markers are used. In other cases, the codestream may comprise a single tile part.

Lastly, an EOC marker is included in the media data box. This is again included to improve the locality of data reference and in this case means that the latter portions of the file do not need to be read just to recover the EOC marker (in the main codestream). For low resolution virtual codestreams the saving introduced by this may be significant.

The fragment table box is constructed containing a single fragment list box. Each entry in the fragment list box points to a segment of codestream such that concatenation of all these collected segments form a valid JPEG2000 codestream, also referred to as the virtual codestream in this specification. For the most part the references in the fragment list box point to segments from the contiguous codestream box except in the case where the markers or marker segments are to be overwritten. In these cases, the modified segments contained in the codestream difference data for the virtual codestream are pointed to by the corresponding fragment list entry. The codestream difference data resides in a Media (MDAT) box (see for example FIG. 9, 9053 and 9063). The combination of the codestream header box, Media box and fragment table box (see FIG. 9, 9050, 9060) form a virtual codestream. Each virtual codestream constitutes a subset, typically a reduced resolution and quality, of the complete image as stored in the contiguous codestream box (see for example FIG. 9, 9070) of the JPX file. The references in the fragment list box are each associated with a corresponding resolution subset of an original image. These references describe a sequence of byte ranges of the codestream and segments of the codestream difference data that are adapted to be spliced together to form a virtual codestream of the reduced resolution. It is worth pointing out that, because of the way we have constructed our contiguous codestream, it is possible to construct each virtual codestream such that it has a single tile part.

7.4 Construction of JPX Image File

Figure 17:
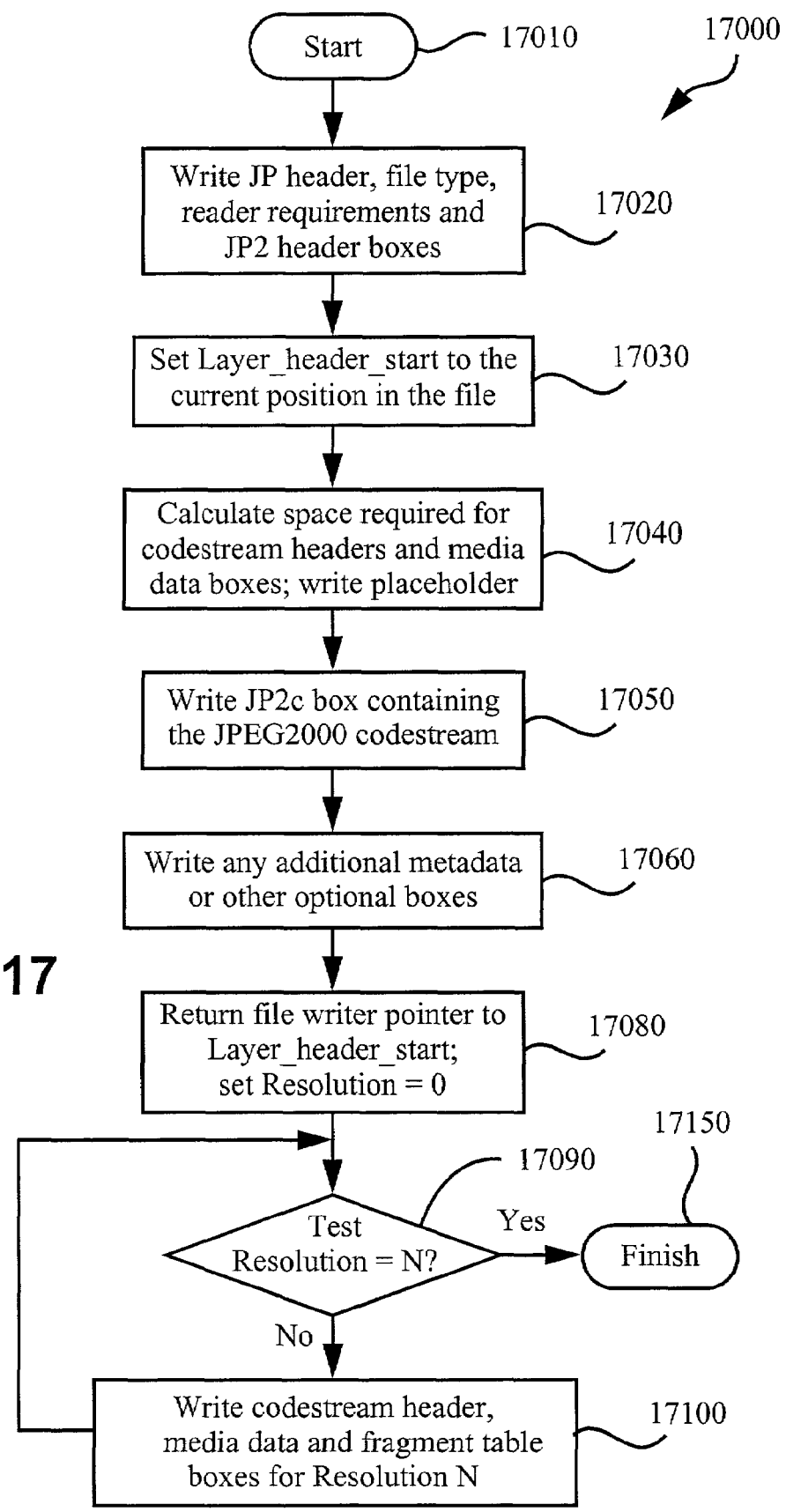
FIG. 17 shows a flow chart of a method of constructing a JPX image file in accordance with the fourth implementation.

Turning now to FIG. 17, there is shown a flow chart of a method of constructing a JPX image file in accordance with the fourth implementation. The method 17000 of constructing a JPX image file starts at step 17010. At the next step 17020 of the method, the fixed file header boxes (signature, file type and reader requirements) of the JPX file are written, as are the image dependent header boxes contained in the JP2 header box. These are written in a form that is compliant with the JPEG2000 part 2 draft standard. After the JP2 header box has been written completely, the position of the write pointer in the JPX file is captured at step 17030 and stored in a variable called herein "layer_header_start". At the next step 17040 of the method, the amount of space required for the storage of all of the header information for the parsed versions of the codestream is calculated and this amount of space is left blank in the file at this step. The part 1 compliant codestream box is then written at step 17050 immediately after this blank (reserved) space. This codestream can be constructed in the manner as described previously in section 7.2. Following the writing of the codestream, any additional metadata such as XML metadata describing the image content is written at step 17060. At the next step 17080 of the method, the method then returns to the position in the JPX file previously stored in the variable "layer_header_start" and enters a loop (17090–17100) over the number of resolutions (or more generally the parsed forms). At decision block 17090 of the loop, a test is performed to determine if headers have been written for all parsed forms, e.g. for all resolutions upto N. If the decision block 17090 returns yes (TRUE) indicating that all headers have been written then execution of the method exits to step 17150. Otherwise execution of the loop body (17100) involves writing any overriding file header information for this particular parsed form in a codestream header box for resolution N. This would include writing any label box describing the current parsed form. Overriding header segments are written in a media data box at step 17100 also. Finally, in step 17100 the fragment table box describing the virtual codestream is written.

Figure 18:
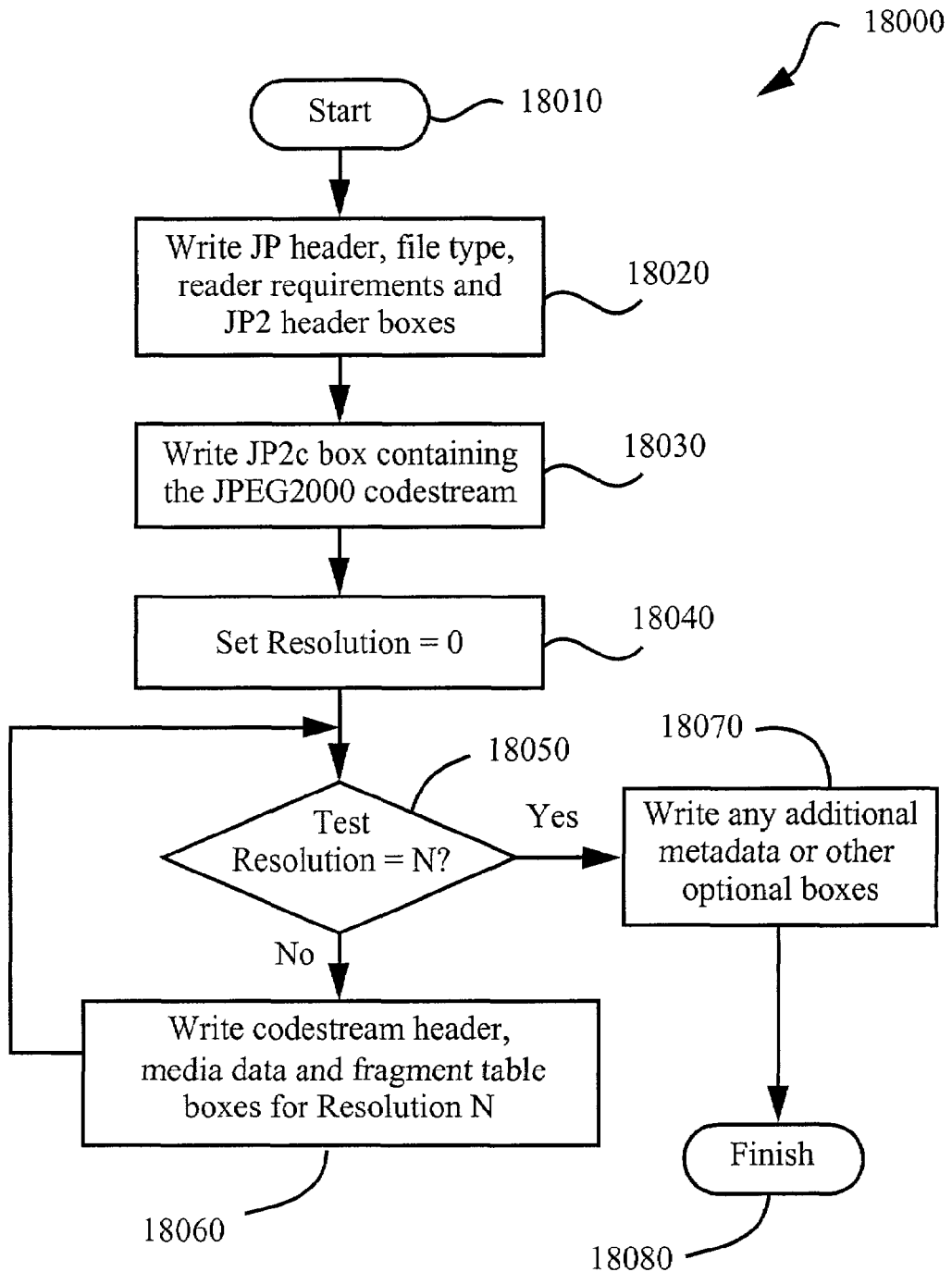
FIG. 18 shows a flow chart of a variation of the method of constructing a JPX image file in accordance with the fourth implementation.
Figure 19:
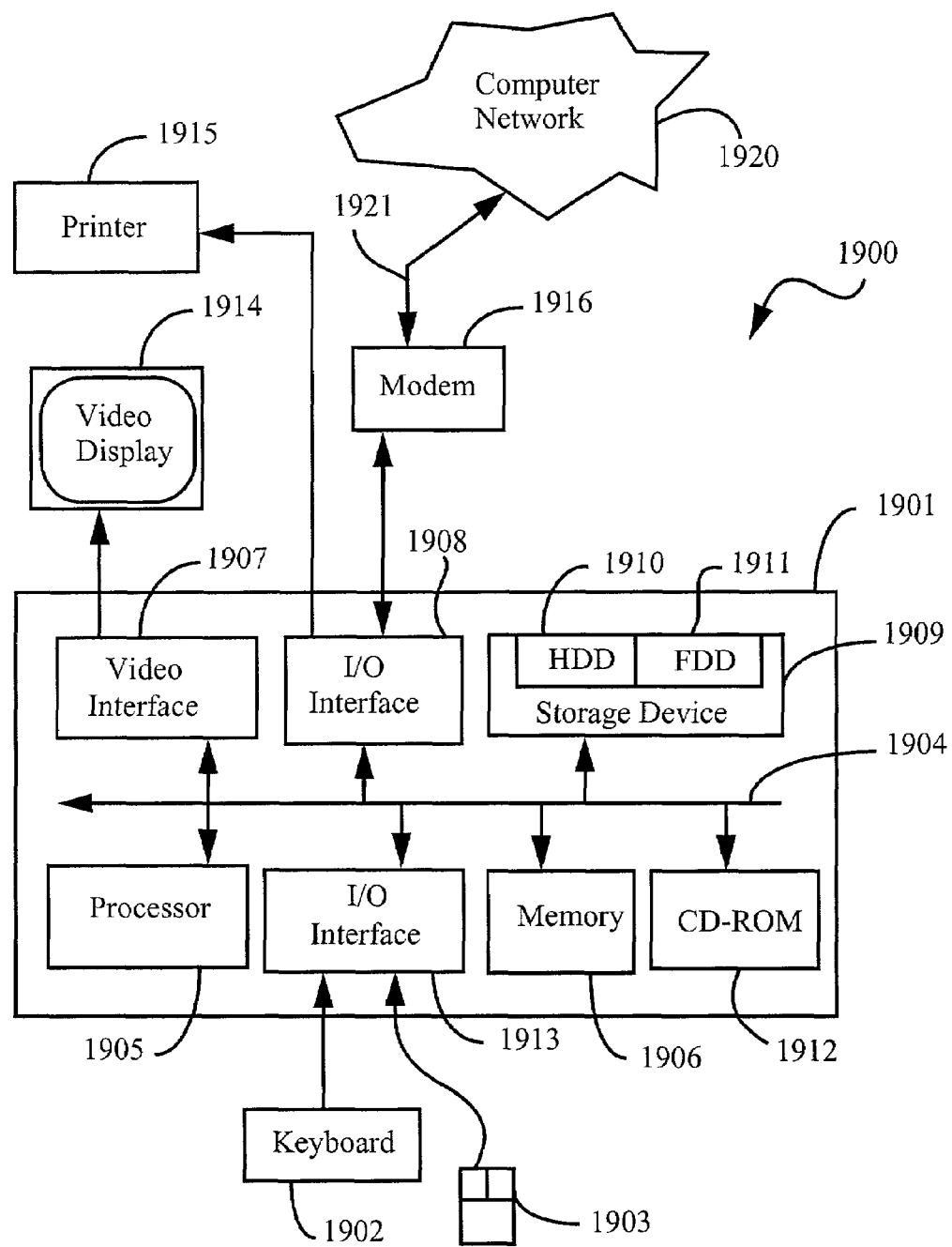
FIG. 19 is a schematic block diagram of a general-purpose computer upon which the methods described can be practiced.

Turning now to FIG. 18, there is shown a flow chart of a variation of the method of constructing a JPX image file in accordance with the fourth implementation. This variation is a simpler method of constructing a JPX image file than the previous method described in relation to FIG. 17, however this variation places layer header information after the codestream. If the codestream is large then this variation may be more difficult to parse simply because the header information is spread out. This may not be a significant issue if random access to the file is efficient. The method 1800 commences at step 18010. At the next step 18020, the fixed file header boxes (signature, file type and reader requirements) are written, as are the image dependent header boxes contained in the JP2 header box. These are written in a form that is compliant with the JPEG2000 part 2 draft standard. After the JP2 header box has been written completely, the part 1 compliant codestream box is then written at step 18030. This codestream can be constructed in the manner as described previously in section 7.2. At the next step 18040, the method enters a loop (18050–18060) over the number of resolutions (or more generally parsed forms). At decision block 18050, a test is performed to determine if headers have been written for all parsed forms, e.g. for all resolutions upto N. If decision box 18050 returns yes (TRUE), indicating that all headers have been written then execution exits to step 18070. Otherwise execution of the loop body (18050–18060) involves writing any overriding file header information for this particular parsed form in a codestream header box. This would include writing any label box describing the current parsed form. Overriding codestream header segments are written in a media data box step 18060 also. Finally, at step 1860 the fragment table box describing the virtual codestream is written. At step 18070, any additional metadata, such as XML metadata describing the image content, is written prior to conclusion of the file writing method at step 18080.

8.0 Fifth Implementation

The task of transcoding a JPX file, constructed in accordance with that described above in sections 7.1, 7.2, 7.3, and 7.4 to produce a reduced resolution JP2 or JPX file will now be described. The input to this parsing process is a label, which matches one of the composition layers in the JPX file. For instance, the label may correspond to a selected reduced resolution level. This reduced resolution level may be selected by a user or may automatically be selected in response to a request from a software application, such as a browser.

The transcoding process is described in more detail with reference to FIG. 10. The process 1000 starts at step 1005. At step 1010, the requested label value is read from the input. At step 1020, the stored file header is read up to but not including the contiguous codestream box. This step amounts to reading the file header in full. At decision block 1030 it is determined whether a codestream satisfying the requested label exists in the file. If decision block 1030 returns "No" then execution exits immediately to 1090. While this is expressed as a simple comparison it need not be in practice in that the server may attempt to select an appropriate parsed form based on a semantic interpretation of the label. If decision block 1030 returns "Yes" then execution proceeds to step 1040. At step 1040 the transcoder writes the JP signature and file type boxes. The JP2 header box is written to the output file at step 1060. At step 1070, the codestream fragments are read based on the information in the fragment table box for the selected, possibly virtual, codestream and written to a contiguous codestream box in the output file. Finally at step 1080, metadata boxes are copied from the input JPX file to the output file before the file is closed and execution exits to step 1090.

Figure 10:
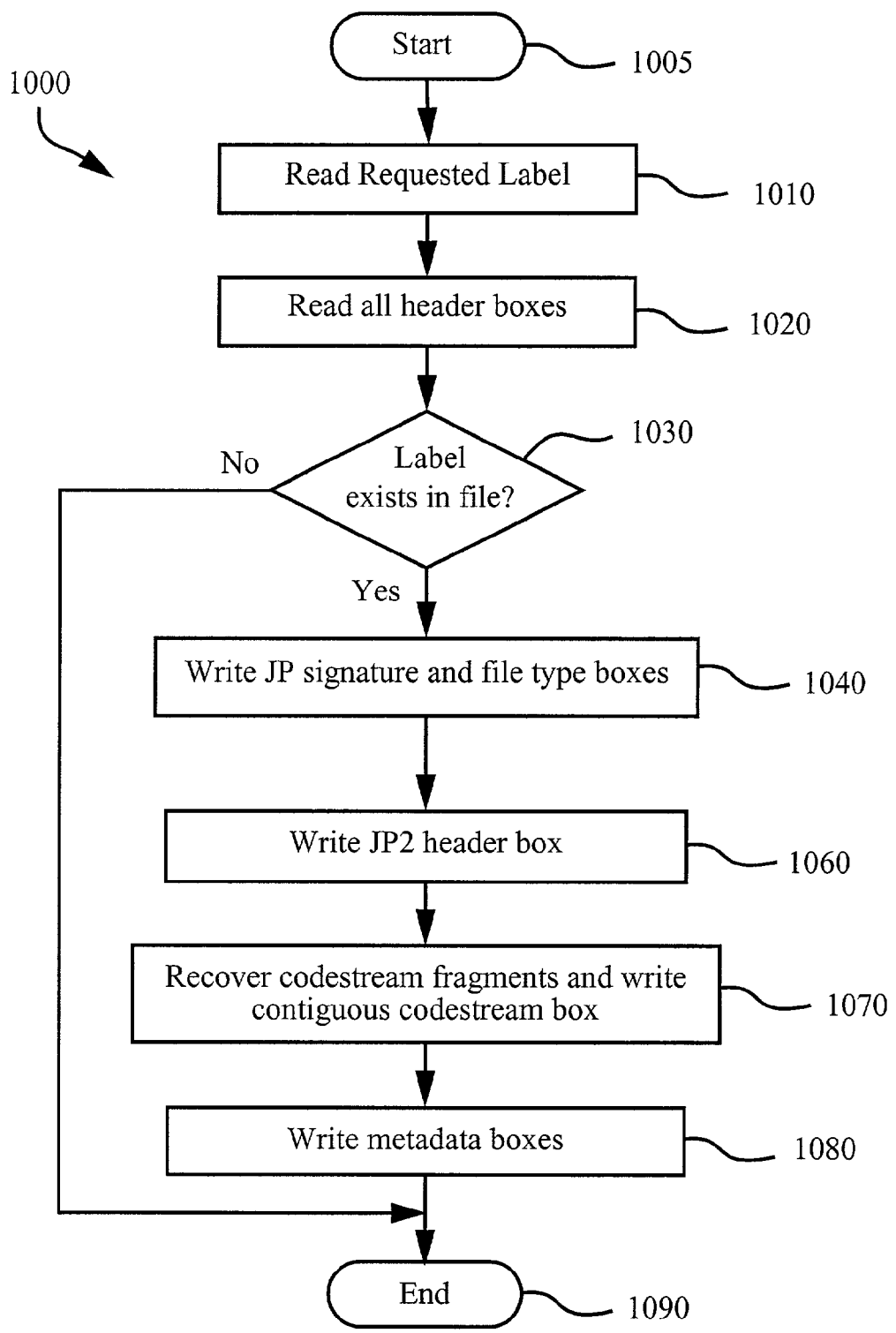
FIG. 10 shows a flow chart of a method of transcoding a constructed JPX file in accordance with the fifth implementation.
Figure 11:
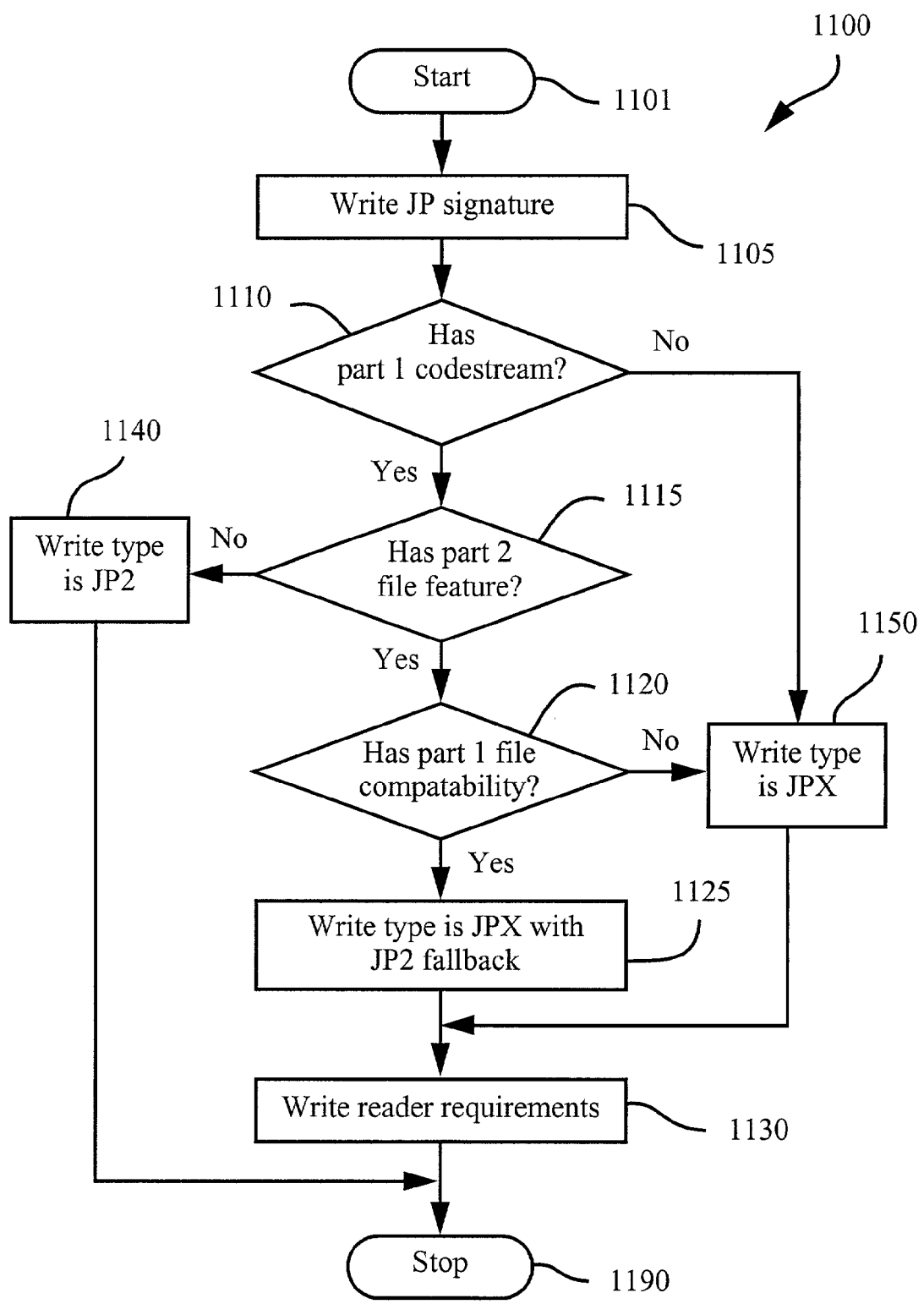
FIG. 11 shows a flow chart of step 1040 in more detail of the method of transcoding of FIG. 10 in accordance with the fifth implementation.

The step 1040 of writing of the signature, file type and reader requirements boxes is dependent on the input JPX file and is performed in accordance with the flow diagram of FIG. 11. The writing step 1040 starts at step 1100. At step 1105, the JP2 signature is written. This signature is common for all JPEG2000 family files. At step 1110 a test is performed to determine whether the input JPX file contains a part 1 compliant codestream. If decision block 1110 returns "yes" then a further test is performed at decision block 1115 to determine if the output file has part 2 features. In general this can be determined from the reader requirements box from the input JPX once all requirements associated with the use of fragmentation and multiple layers are factored out. If decision block 1115 returns "Yes" then a further test is performed at decision block 1120 to determine whether the output file has a JP2 compatibility mode. In general this is true if the input JPX file has a JP2 compatibility mode. If decision block 1120 returns "Yes" then a file type box for a JPX file with JP2 compatibility is written. The specific reader requirements are then generated and written at step 1130 before execution exits at step 1190. If decision block 1110 returned "No", indicating that part 2 extensions were present in the codestream then the a file type box for a JPX only file is written at step 1150. The specific reader requirements are then generated and written at step 1130 before execution exits at step 1190. If decision block 1115 returns "no" indicating that the output file will have no part 2 features then a file type box for a JP2 only file is written at step 1140. The specific reader requirements are then generated and written at step 1130 before execution exits at step 1190 and returns to the main transcoding process of FIG. 10.

Figure 12:
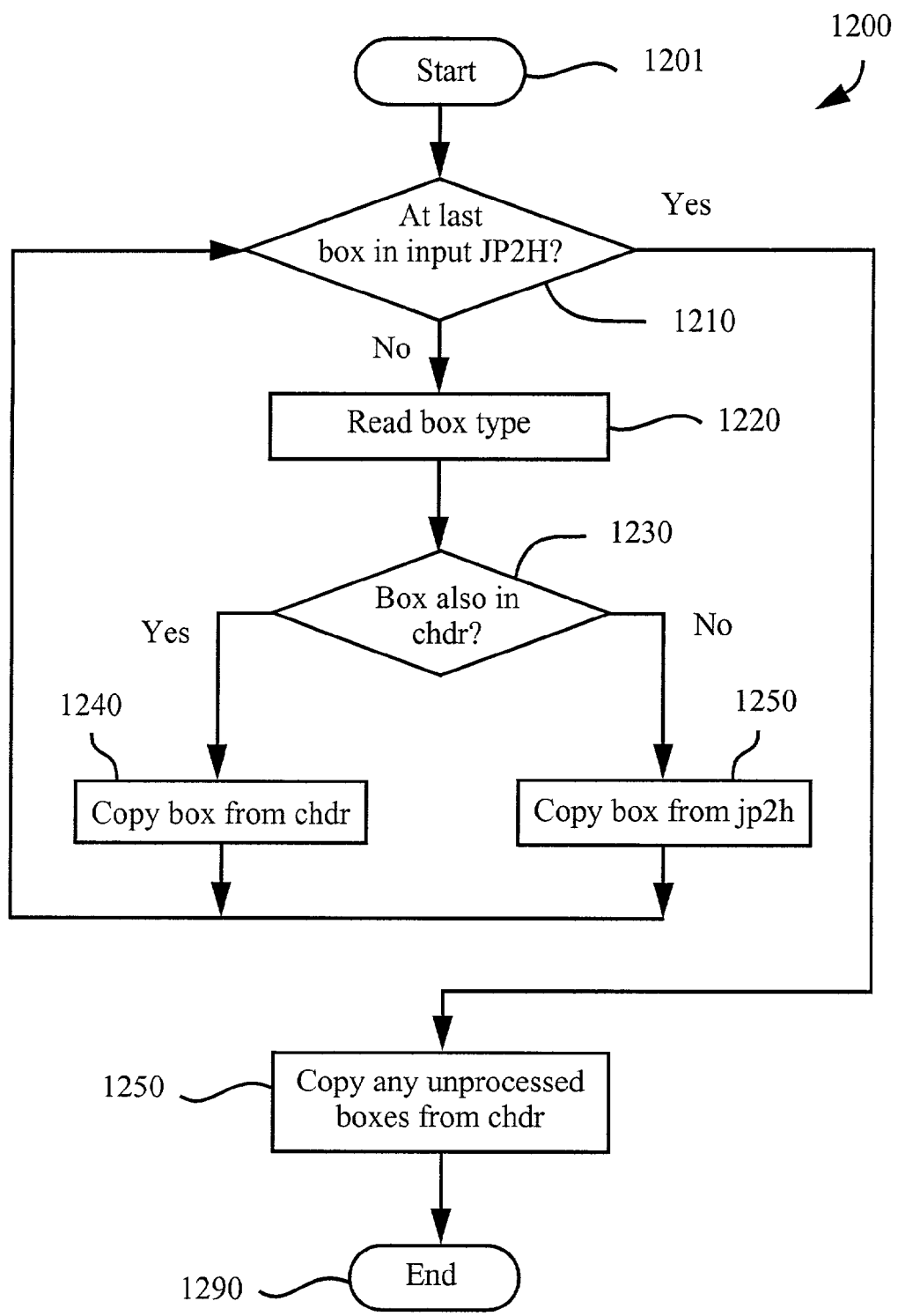
FIG. 12 shows a flow chart of step 1060 in more detail of the method of transcoding of FIG. 10 in accordance with the fifth implementation.

The step 1060 of writing the JP2 header box is described in detail with reference to FIG. 12. Execution of the writing step 1060 is in the form of a loop, which starts at step 1201. At decision block 1210, a test is performed to determine whether we have examined all boxes in the input JP2 header box. If decision block 1210 returns "No" then the next header block is examined to determine its type. At decision block 1220, the codestream header (jpch) and any composition layer header (jplh) for the virtual codestream being extracted are examined to determine if a box of the same type, representing an override, is present. If decision block 1230 returns "yes" indicating that an override is present then this box is copied to the output at step 1240. If decision block 1230 returns "no" indicating that the global defaults contained in the jp2 header apply for this virtual codestream then the box is copied to the output from the jp2h at step 1250. After the output box is written—at step 1240 or 1250—loop execution returns to decision block 1210. When all header blocks in the jp2 header have been processed, decision block 1210 returns "Yes" and execution moves to step 1250 where any unprocessed boxes from the jpch and jplh are copied to the output file. If these boxes are defined by the JP2 specification then they are written as part of the output jp2 header box, if not then they must be written in a jpch box in the output codestream. (In this case the output file is a JPX file.).

9.0 Sixth Implementation

The task of decoding a JPX file, constructed in accordance with that described above in sections 7.1, 7.2, 7.3, and 7.4 to produce a reduced resolution image will now be described. The input to this decoding process is a label, which matches one of the composition layers in the JPX file. For instance, the label may correspond to a selected reduced resolution level. This reduced resolution level may be selected by a user or may automatically be selected in response to a request from a software application, such as a browser.

The decoding process is somewhat similar to the transcoding process described in the previous section 8.0 with reference to FIG. 10, and will only be briefly described. The decoding process performs the same steps 1005, 1010, 1020, and 1030 as the transcoding process. In the decoding process, if the decision block 1030 returns "no", then the process terminates. Otherwise, the decoding process proceeds to a next step (not shown) and reads the codestreams fragments based on the information in the fragment table box to reconstitute the codestream corresponding to the selected label. The process then decodes the codestream to produce the selected reduced resolution image and terminates.

9.1 Generalizations

Though the fourth, fifth and sixth implementations produce and/or utilise a file in which each virtual codestream corresponds to a different resolution and quality of the image as parsed from a master JPEG2000 codestream, other parsed forms and combinations of parsed forms are equally possible and consistent with the aforementioned implementations. For example it is possible to construct a file in which each virtual codestream corresponds to a different bit rate of the full resolution image. A slightly more complex possibility is that different progression orders be described using virtual codestreams. A single file may also contain any combination of these. Further, the (JPEG2000) standard permits that the data referenced by a fragment table need not reside in the same file as the fragment table itself.

Namely, the fourth, fifth and sixth implementations produce and/or utilise a file in which the master JPEG2000 codestream is divided into a number of subsets of different quality and resolution subsets that can be extracted from the file. However, these implementations are not limited thereto and can include other parsed forms. For example, the file can include a number of subsets of different quality subsets only, or a number of subsets of different resolution subsets only.

10.0 Application

A scenario where the above implementations may be useful is now presented. The first implementation is selected for the purposes of an example.

A user selects a compressed image, or set of compressed images for emailing to a friend. The compressed images are of a relatively high resolution, for example 2048 pixels wide by 1536 pixels high, and consequently even compressed, the images constitute a significant amount of data. For display purposes a resolution of 512×384 by the friend may be sufficient. The email application prompts the user if the user would like the application to reduce the size of the compressed images, as the amount of data to email is quite significant. If the user desires this the email application then reduces the resolution of the compressed images by a factor of 2 (ie to resolution S−2), using the first implementation. Thus not only are the images reduced in resolution, but least significant bit-planes are also discarded from the maintained resolutions. In this way a greater bit-rate reduction is achieved for a given resolution reduction.

The aforementioned method(s) comprise a particular control flow. There are many other variants of the method(s) which use different control flows without departing the spirit or scope of the invention. Furthermore one or more of the steps of the method(s) may be performed in parallel rather sequential.

The methods of the first, second, third, fourth, fifth, or sixth implementations can individually be preferably practiced using a general-purpose computer system 1700, such as that shown in FIG. 17 wherein the methods may be implemented as software, such as an application program executing within the computer system 1700. In particular, the steps of the methods are effected by instructions in the software that are carried out by the computer. The software may be divided into two separate parts; one part for carrying out the methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for implementation of the methods.

The computer system 1700 comprises a computer module 1701, input devices such as a keyboard 1702 and mouse 1703, output devices including a printer 1715 and a display device 1714. A Modulator-Demodulator (Modem) transceiver device 1716 is used by the computer module 1701 for communicating to and from a communications network 1720, for example connectable via a telephone line 1721 or other functional medium. The modem 1716 can be used to obtain access to the Internet, and other network systems, such as a Local Area Network (LAN) or a Wide Area Network (WAN).

The computer module 1701 typically includes at least one processor unit 1705, a memory unit 1706, for example formed from semiconductor random access memory (RAM) and read only memory (ROM), input/output (I/O) interfaces including a video interface 1707, and an I/O interface 1713 for the keyboard 1702 and mouse 1703 and optionally a joystick (not illustrated), and an interface 1708 for the modem 1716. A storage device 1709 is provided and typically includes a hard disk drive 1710 and a floppy disk drive 1711. A magnetic tape drive (not illustrated) may also be used. A CD-ROM drive 1712 is typically provided as a non-volatile source of data. The components 1705 to 1713 of the computer module 1701, typically communicate via an interconnected bus 1704 and in a manner, which results in a conventional mode of operation of the computer system 1700 known to those in the relevant art. Examples of computers on which the described arrangements can be practised include IBM-PC's and compatibles, Sun Sparcstations or alike computer systems evolved therefrom.

Typically, the application program is resident on the hard disk drive 1710 and read and controlled in its execution by the processor 1705. Intermediate storage of the program and any data fetched from the network 1720 may be accomplished using the semiconductor memory 1706, possibly in concert with the hard disk drive 1710. In some instances, the application program may be supplied to the user encoded on a CD-ROM or floppy disk and read via the corresponding drive 1712 or 1711, or alternatively may be read by the user from the network 1720 via the modem device 1716. Still further, the software can also be loaded into the computer system 1700 from other computer readable medium including magnetic tape, a ROM or integrated circuit, a magneto-optical disk, a radio or infra-red transmission channel between the computer module 1701 and another device, a computer readable card such as a PCMCIA card, and the Internet and Intranets including email transmissions and information recorded on websites and the like. The foregoing is merely exemplary of relevant computer readable mediums. Other computer readable media may alternately be used.

The methods may alternatively be implemented in dedicated hardware such as one or more integrated circuits performing the functions or sub functions of the methods. Such dedicated hardware may include graphic processors, digital signal processors, or one or more microprocessors and associated memories.

INDUSTRIAL APPLICABILITY

It is apparent from the above that the arrangements described are applicable to the computer graphics and related industries).

The foregoing describes only some embodiments of the present invention, and modifications and/or changes can be made thereto without departing from the scope and spirit of the invention, the embodiment(s) being illustrative and not restrictive.

We claim:

1. A method of transcoding a first image file to a second image file, wherein the first image file comprises a single codestream and a table comprising references associated with different parsed forms of the single codestream for referencing segments of codestream header data and segments of the single codestream, the method comprising:
   selecting a parsed form of the single image codestream;
   locating, by using the table, those codestream segments associated with the selected parsed form;
   locating, by using the table, those codestream header data associated with the selected parsed form; and
   writing the located codestream header data and codestream segments as a single codestream of the selected parsed form to the second image file.

2. A method as claimed in claim 1, wherein the references associated with a selected parsed form describe a sequence of byte ranges that are to be spliced together from the segments of codestream header data and the segments of the single codestream and written as the single codestream of the selected parsed form to the second image file.

3. A method as claimed in claim 1, wherein the first image file comprises a label that is descriptive of the parsed form it contains.

4. A method as claimed in claim 1, wherein the second image file is JP2 compatible.

5. A method as claimed in claim 1, wherein the first image file is JPX compatible.

6. A method as claimed in claim 1, wherein each parsed form corresponds to a reduced resolution level of an original image.

7. A method as claimed in claim 1, wherein the parsed forms comprise one or more distinct composition layers of an original image.

8. A method as claimed in claim 7, wherein the number of composition layers in each parsed form is equal to the number of resolutions of the original image.

9. A method as claimed in claim 8, wherein the nth composition layer for the nth resolution yields a fixed effective bit rate for all n.

10. A method according to claim 1, wherein the first image file comprises a first coded representation of an original image and the second image file comprises a second coded representation of a reduced resolution of the original image, the image files each being a corresponding parsed form of the single image codestream, wherein the original image was previously encoded using an S-level DWT and blocks of DWT coefficients were previously coded in sub-passes to provide the first coded representation, the method comprising the steps of:
   determining a desired reduced resolution level J of the first coded representation, wherein J is less than S;
   determining using the table a number of sub passes to extract from each coded block of the first coded representation based on a predetermined image quality at the desired resolution level J; and
   extracting those determined sub-passes to form the second coded representation of the original image, wherein a reconstructed image of the second coded representation of the original image is not significantly degraded visually compared with a reconstructed image of the first coded representation at the desired resolution level J.

11. A method as claimed in claim 10, wherein said step of determining a number of sub-passes to extract is based on a predetermined target bit rate threshold at the resolution J, and the predetermined target bit rate is a function of the resolution level J.

12. The method as claimed in claim 10, further comprising the step of producing a coded representation.

13. The method as claimed in claim 1, further comprising the step of producing an image file.

14. A method of generating a first image file from an original image, the method comprising the steps of:
   generating a single codestream representative of the original image, wherein said single codestream comprises a plurality of different parsed forms of the image; and
   generating a first image file, wherein the first image file comprises segments of the single codestream and segments of codestream header data associated with different parsed forms of the original image, and a table comprising references associated with the different parsed forms of the original image for referencing segments of codestream header data and segments of the single codestream.

15. The method as claimed in claim 14, further comprising the step of producing an image file.

16. A method as claimed in claim 14, wherein the references associated with a parsed form describe a sequence of byte ranges that are to be spliced together from the segments of codestream header data and the segments of the single codestream.

17. A method as claimed in claim 14, wherein the first image file comprises a label that is descriptive of the parsed form it contains.

18. A method as claimed in claim 14, wherein the first image file is JPX compatible.

19. A method as claimed in claim 14, wherein each parsed form corresponds to a reduced resolution level of the original image.

20. A method as claimed in claim 14, wherein the parsed forms comprise one or more distinct composition layers.

21. A method as claimed in claim 20, wherein the number of composition layers in each parsed form is equal to the number of resolutions of the original image.

22. A method as claimed in claim 21, wherein the nth composition layer for the nth resolution yields a fixed effective bit rate for all n.

23. A method as claimed in claim 14, wherein the original image is encoded as a single tile and the codestream thereof is divided into tile parts with packet length and packet header markers, when present, provided per tile part and so that the markers for each tile part comprise information for that tile part.

24. A method as claimed in claim 23, wherein tile part boundaries correspond to fragment boundaries.

25. A method according to claim 14, wherein said step of generating the single codestream comprises the sub-steps of:
 transforming the original image with an S-level DWT transform to produce a plurality of subbands of DWT coefficients;
 quantizing the DWT coefficients of each subband according to a quantisation table;
 dividing each subband into one or more codeblocks of quantized DWT coefficients; entropy encoding the codeblocks to form a number of coded sub passes; and
 arranging the coded sub-passes into a number of block layers, wherein the codeblocks in resolution levels greater than resolution level l make no contributions to block layers 0,1 . . . ,l, so as to enable a reconstruction of a resolution of the original image of just visually acceptable quality.

26. A method as claimed in claim 25, wherein the number of coded sub-passes of any codeblock arranged in any block layer is predetermined.

27. A method as claimed in claim 25, wherein the generating of the single codestream comprises the additional sub-step of:
 arranging the block layers into the codestream according to a layer—resolution level progression order.

28. A method as claimed in claim 25, wherein the quantization table comprises:

| Sub-band/level | 1 | 2 | 3 | 4 | 5 | 6 | 7 |
|---|---|---|---|---|---|---|---|
| LL | 3.5241 | 1.5655 | 1.2589 | 1.2589 | 1.2589 | 1.2589 | 1.2589 |
| HL/LH | 9.7500 | 2.5877 | 1.6696 | 1.5932 | 1.5932 | 1.5932 | 1.5932, |
| HH | 24.5784 | 4.3179 | 1.8491 | 1.3709 | 1.3709 | 1.3709 | 1.3709. |

29. A method as claimed in claim 25, wherein said transforming sub-step separately transforms image components of the image using different level DWTs.

30. The method as claimed in claim 25, further comprising the step of producing a coded representation.

31. A method of decoding a first image file to provide an image, wherein the first image file comprises a single codestream and a table comprising references associated with different parsed forms of the single codestream for referencing segments of codestream header data and segments of the single code stream, the method comprising:
 selecting a parsed form of the single image codestream;
 locating, by using the table, those codestream segments associated with the selected parsed form;
 locating, by using the table, those codestream header data associated with the selected parsed form;
 constructing a single codestream of the selected parsed form from the located codestream header data and codestream segments; and
 decoding the constructed single codestream to produce an image of the selected parsed form.

32. A method as claimed in claim 31, wherein the references associated with a selected parsed form describe a sequence of byte ranges of the segments of codestream header data and the segments of the single codestream.

33. A method as claimed in claim 31, wherein the first image file comprises a label that is descriptive of the parsed form it contains.

34. A method as claimed in claim 31, wherein the first image file is JPX compatible.

35. A method as claimed in claim 31, wherein each parsed form corresponds to a reduced resolution level of an original image.

36. A method as claimed in claim 31, wherein the parsed forms comprise one or more distinct composition layers of an original image.

37. A method as claimed in claim 36, wherein the number of composition layers in each parsed form is equal to the number of resolutions of the original image.

38. A method as claimed in claim 37, wherein the nth composition layer for the nth resolution yields a fixed effective bit rate for all n.

39. A method according to claim 31, wherein the first image file is a coded representation of an original image, wherein the original image was previously encoded using an S-level DWT transform and blocks of DWT coefficients were previously coded in sub-passes to provide the coded representation, being one of the parsed forms, the method comprising;
 determining a desired reduced resolution level J to decode, wherein J is less than S;
 determining, using the table, a number of sub-passes to discard for each coded block based on a predetermined image quality at the resolution level J;
 discarding the determined sub-passes from the code blocks; and
 decoding those sub-passes not discarded to reconstruct the image at the desired reduced resolution level J, wherein the reconstructed image is not significantly degraded visually compared with an image reconstructed from the coded representation at the desired resolution level J using all sub-passes.

40. A method as claimed in claim 39, wherein said step of determining a number of sub-passes to discard is based on a predetermined target bit rate threshold at the resolution J, and the predetermined target bit rate is a function of the resolution level J.

41. A method according to claim 31, the image being encoded to provide at least one parsed form using an S-level DWT, wherein S is an integer and wherein blocks of DWT coefficients are coded in sub-passes, the method comprising:

determining a desired resolution J to decode, wherein J is less than S;

determining, using the table, a number of sub-passes to extract for each block code based on the resolution;

extracting determined sub-passes from the block codes; and reconstructing the image from the extracted sub-passes at the desired reduced resolution J, wherein the reconstructed image is not significantly degraded visually compared with an image reconstructed from the coded representation at the desired resolution J using all sub-passes.

42. Apparatus for transcoding a first image file to a second image file, wherein the first image file comprises a single codestream and a table comprising references associated with different parsed forms of the single codestream for referencing segments of codestream header data and segments of the single codestream, the apparatus comprising:

means for selecting a parsed form of the single image codestream:

means for locating, by using the table, those codestream segments associated with the selected parsed form;

means for locating, by using the table, those codestream header data associated with the selected parsed form; and means for writing the located codestream header data and codestream segments as a single codestream of the selected parsed form to the second image file.

43. Apparatus according to claim 42, wherein the first image file comprises a first coded representation of an original image and the second image file comprises a second coded representation of a reduced resolution of the original image, the image files each being a corresponding parsed form of the single image codestream, wherein the original image was previously encoded using an S-level DWT and blocks of DWT coefficients were previously coded in sub-passes to provide the first coded representation, the apparatus comprising:

means for determining a desired reduced resolution level J of the first coded representation, wherein J is less than S;

means for determining, using the table, a number of sub-passes to extract from each coded block of the first coded representation based on a predetermined image quality at the desired resolution level J; and means for extracting those determined sub-passes to form the second coded representation of the original image, wherein a reconstructed image of the second coded representation of the original image is not significantly degraded visually compared with a reconstructed image of the first coded representation at the desired resolution level J.

44. Apparatus for generating a first image file from an original image, the apparatus comprising:

means for generating a single code stream representative of the original image, wherein the single codestream comprises a plurality of different parsed forms of the image; and means for generating a first image file, wherein the first image file comprises segments of the single codestream and segments of code stream header data associated with different parsed forms of the original image, and a table comprising references associated with the different parsed forms of the original image for referencing segments of codestream header data and segments of the single codestream.

45. Apparatus according to claim 44, wherein the means for generating the single codestream comprises:

means for transforming the original image with an S-level DWT transform to produce a plurality of subbands of DWT coefficients;

means for quantizing the DWT coefficients of each subband according to a quantization table;

means for dividing each subband into one or more codeblocks of quantized DWT coefficients; and means for entropy encoding the codeblocks to form a number of coded subpasses and for arranging the coded sub-passes into a number of block layers, wherein the codeblocks in resolution levels greater than resolution level l make no contributions to block layers 0,1 . . . ,l, so as to enable a reconstruction of a resolution of the original image of just visually acceptable quality.

46. Apparatus for decoding a first image file to provide an image, wherein the first image file comprises a single codestream and a table comprising references associated with different parsed forms of the single codestream for referencing segments of codestream header data and segments of the single codestream, the apparatus comprising:

means for selecting a parsed form of the single image codestream:

means for locating, by using the table, those codestream segments associated with the selected parsed form;

means for locating, by using the table, those codestream header data associated with the selected parsed form;

means for constructing a single codestream of the selected parsed form from the located codestream header data and codestream segments; and means for decoding the constructed single codestream to produce an image of the selected parsed form.

47. Apparatus according to claim 46, wherein the first image file is a coded representation of an original image, wherein the original image was previously encoded using an S-level DWT transform and blocks of DWT coefficients were previously coded in sub-passes to provide the coded representation, being one of the parsed forms, the apparatus comprising:

means for determining a desired reduced resolution level J to decode, wherein J is less than S;

means for determining, using the table, a number of sub-passes to discard for each coded block based on a predetermined image quality at the resolution level J;

means for discarding the determined sub-passes from the code blocks; and means for decoding those sub-passes not discarded to reconstruct the image at the desired reduced resolution level J, wherein the reconstructed image is not significantly degraded visually compared with an image reconstructed from the coded representation at the desired resolution level J using all sub passes.

48. Apparatus according to claim 46, the image being encoded to provide at least one parsed form using an S-level DWT, wherein S is an integer and wherein blocks of DWT coefficients are coded in sub-passes, the apparatus comprising:

means for determining a desired resolution J to decode, wherein J is less than S;

means for determining using the table a number of sub-passes to extract for each block code based on the resolution;

means for extracting determined sub-passes from the block codes; and means for reconstructing the image from the extracted sub-passes at the desired reduced resolution J, wherein the reconstructed image is not significantly degraded visually compared with an image reconstructed from the coded representation at the desired resolution J using all sub-passes.

49. A program stored on a computer-readable medium which, when executed, performs a method for transcoding a first image file to a second image file, wherein the first image file comprises a single codestream and a table comprising references associated with different parsed forms of the single codestream for referencing segments of codestream header data and segments of the single codestream, the program comprising:

code for selecting a parsed form of the single image codestream:

code for locating, by using the table, those codestream segments associated with the selected parsed form;

code for locating, by using the table, those codestream header data associated with the selected parsed form; and code for writing the located codestream header data and codestream segments as a single codestream of the selected parsed form to the second image file.

50. A program stored on a computer-readable medium according to claim 49, wherein the first image file comprises a first coded representation of an original image and the second image file comprises a second coded representation of a reduced resolution of the original image, the image files each being a corresponding parsed form of the single image codestream, wherein the original image was previously encoded using an S-level DWT and blocks of DWT coefficients were previously coded in sub-passes to provide the first coded representation, the program further comprising:

code for determining a desired reduced resolution level J of the first coded representation, wherein J is less than S;

code for determining using the table a number of sub-passes to extract from each coded block of the first coded representation based on a predetermined image quality at the desired resolution level J; and code for extracting those determined sub-passes to form the second coded representation of the original image, wherein a reconstructed image of the second coded representation of the original image is not significantly degraded visually compared with a reconstructed image of the first coded representation at the desired resolution level J.

51. A program stored on a computer-readable medium which, when executed, performs a method for generating a first image file from an original image, the program comprising:

code for generating a single codestream representative of the original image, wherein the single codestream comprises a plurality of different parsed forms of the image; and code for generating a first image file, wherein the first image file comprises segments of the single codestream and segments of codestream header data associated with different parsed forms of the original image, and a table comprising references associated with the different parsed forms of the original image for referencing segments of codestream header data and segments of the single codestream.

52. A program stored on a computer-readable medium according to claim 51, wherein the code for generating the single codestream comprises:

code for transforming the original image with an S-level DWT transform to produce a plurality of subbands of DWT coefficients;

code for quantizing the DWT coefficients of each subband according to a quantization table;

code for dividing each subband into one or more codeblocks of quantized DINT coefficients; and code for entropy encoding the codeblocks to form a number of coded sub-passes and for arranging the coded sub passes into a number of block layers, wherein the codeblocks in resolution levels greater than resolution level 1 make no contributions to block layers 0,1 . . . ,l, so as to enable a reconstruction of a resolution of the original image of just visually acceptable quality.

53. A program stored on a computer-readable medium which, when executed, performs a method for decoding a first image file to provide an image, wherein the first image file comprises a single codestream and a table comprising references associated with different parsed forms of the single codestream for referencing segments of codestream header data and segments of the single codestream, the program comprising:

code for selecting a parsed form of the single image code stream:

code for locating, by using the table, those codestream segments associated with the selected parsed form;

code for locating, by using the table, those codestream header data associated with the selected parsed form;

code for constructing a single code stream of the selected parsed form from the located codestream header data and codestream segments; and code for decoding the constructed single codestream to produce an image of the selected parsed form.

54. A program stored on a computer-readable medium according to claim 53, wherein the first image file is a coded representation of an original image, wherein the original image was previously encoded using an S-level DWT transform and blocks of DWT coefficients were previously coded in sub-passes to provide the coded representation, being one of the parsed forms, the program further comprising:

code for determining a desired reduced resolution level J to decode, wherein J is less than S;

code for determining using the table a number of sub-passes to discard for each coded block based on a predetermined image quality at the resolution level J;

code for discarding the determined sub-passes from the code blocks; and code for decoding those sub-passes not discarded to reconstruct the image at the desired reduced resolution level J, wherein the reconstructed image is not significantly degraded visually compared with an image reconstructed from the coded representation at the desired resolution level J using all sub-passes.

55. A program stored on a computer-readable medium according to claim 53, the image being encoded to provide at least one parsed form using an S-level DWT, wherein S is an integer and wherein blocks of DWT coefficients are coded in sub-passes, the program further comprising:

code for determining a desired resolution J to decode, wherein J is less than S;

code for determining using the table a number of sub-passes to extract for each block code based on the resolution;

code for extracting determined sub-passes from the block codes; and code for reconstructing the image from the extracted sub-passes at the desired reduced resolution J, wherein the reconstructed image is not significantly degraded visually compared with an image reconstructed from the coded representation at the desired resolution J using all sub-passes.

* * * * *

UNITED STATES PATENT AND TRADEMARK OFFICE
CERTIFICATE OF CORRECTION

| | | |
|---|---|---|
| PATENT NO. | : 7,110,608 B2 | Page 1 of 4 |
| APPLICATION NO. | : 10/184938 | |
| DATED | : September 19, 2006 | |
| INVENTOR(S) | : Woei Chan et al. | |

It is certified that error appears in the above-identified patent and that said Letters Patent is hereby corrected as shown below:

SHEET 3

Figure 4:
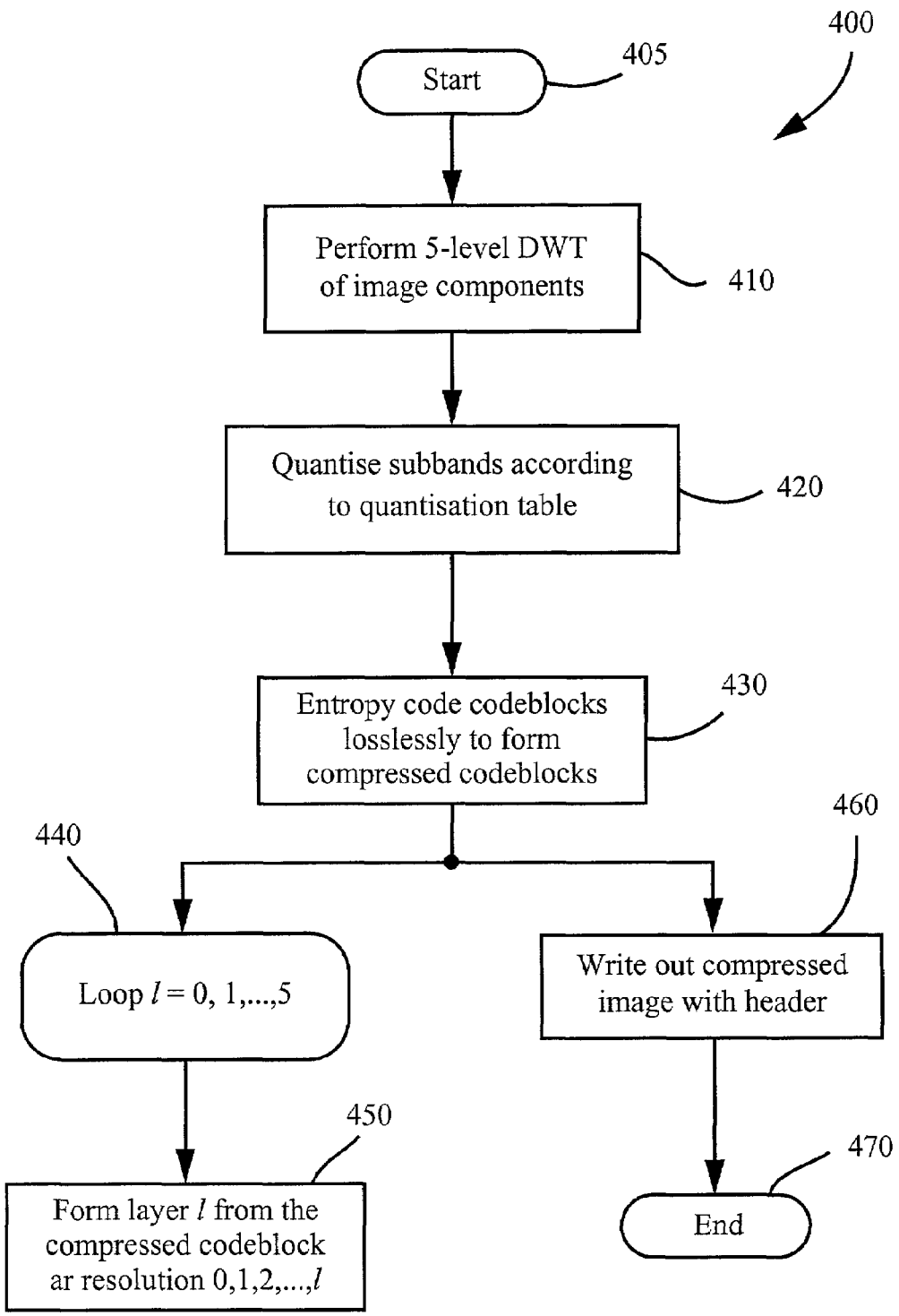
FIG. 4 shows a flow chart of a method of encoding an original image to provide a JPEG2000 coded representation of the original image in accordance with a second implementation.

FIG. 4, "ar" should read --at--.

SHEET 5

FIG. 6A, "(B = f(r)))" should read --(B = f(r))--.

SHEET 9

Figure 8:
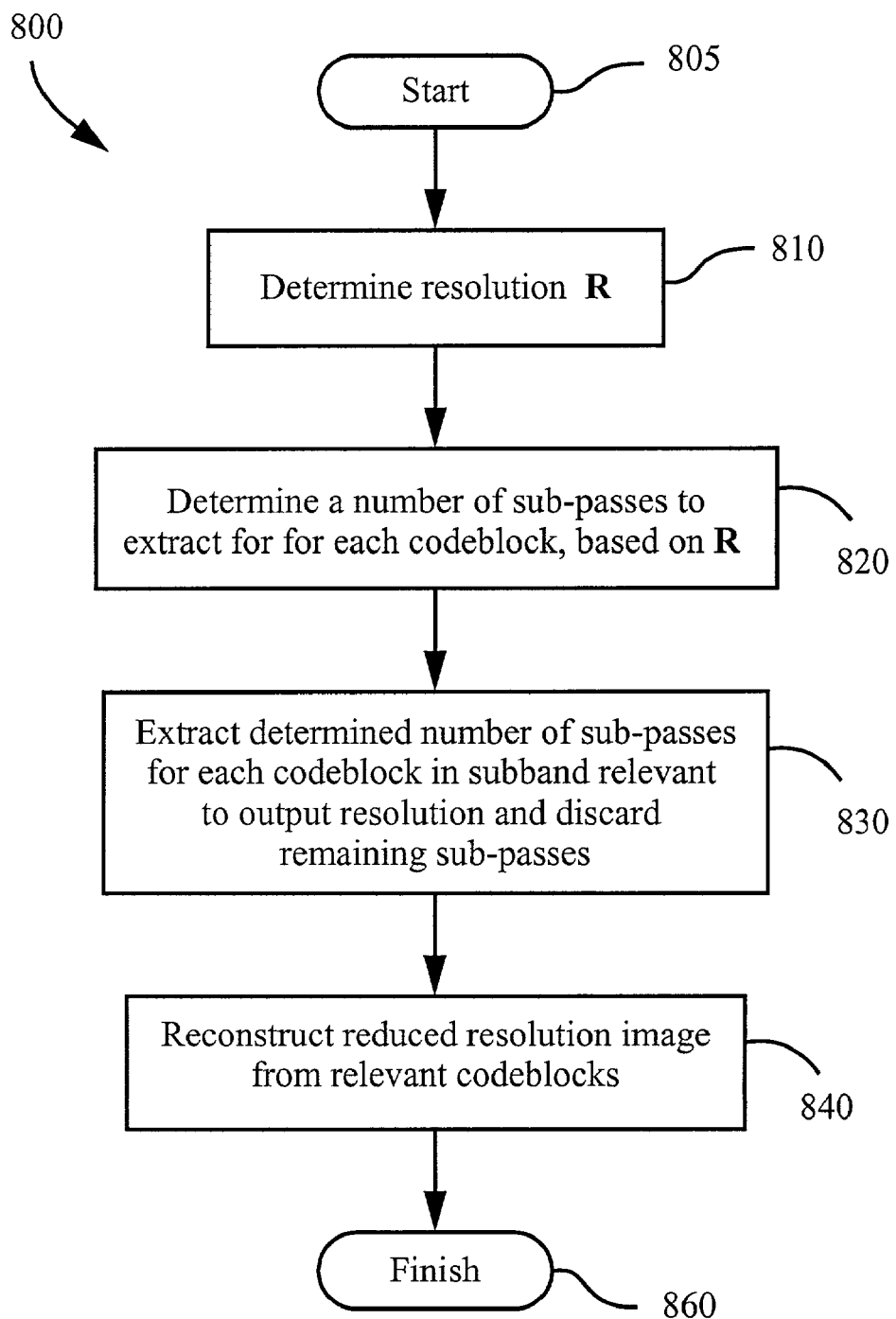
FIG. 8 shows a flowchart which is an overview of the first, second, third, fourth, fifth, and sixth implementations.

FIG. 8, "for for" should read --for--.

SHEET 10

Figure 9:
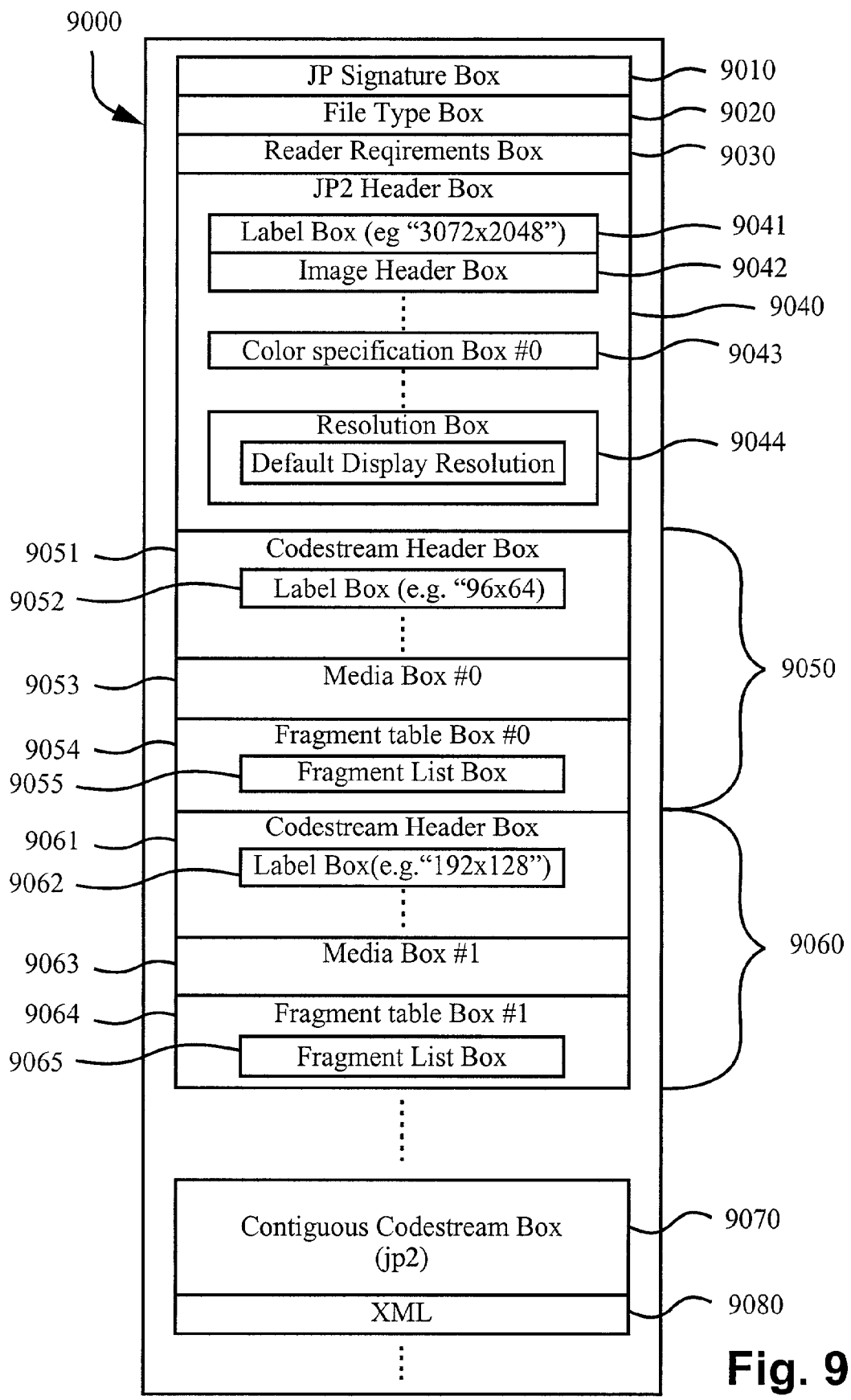
FIG. 9 illustrates the basic structure of a JPX file constructed in accordance with the fourth implementation.

FIG. 9, "Reqirements" should read --Requirements--; "(eg "3072x2048")" should read --(e.g. "3072x2048")--; and "(e.g. "96x64")" should read --(e.g. "96x64")--.

SHEET 12

FIG. 11, "compatability?" should read --compatibility?--.

SHEET 16

FIG. 15B, "Reqirements" should read --Requirements--; and (eg "3072x2048") should read --(e.g. "3072x2048")--.

COLUMN 3

Line 28, "an" should read --a--.

COLUMN 7

Line 30, "shows" should read --show--.

COLUMN 9

Line 26, "S-1, ..., n" should read --S-1, ..., n.--.

UNITED STATES PATENT AND TRADEMARK OFFICE
CERTIFICATE OF CORRECTION

| | |
|---|---|
| PATENT NO. | : 7,110,608 B2 |
| APPLICATION NO. | : 10/184938 |
| DATED | : September 19, 2006 |
| INVENTOR(S) | : Woei Chan et al. |

It is certified that error appears in the above-identified patent and that said Letters Patent is hereby corrected as shown below:

COLUMN 10

Line 46, "codeblock" should read --codeblocks--.

COLUMN 11

Line 20, "of" should read --or--;
   Line 21, "(16251)" should read --(16251).--;
   Line 44, "headers," should read --header,--; and
   Line 49, "headers," should read --header,--.

COLUMN 14

Line 4, "y=Ax" should read --y=Ax.--; and
   Line 10, "x'=$A^{-1}$y'" should read --x'=$A^{-1}$y'.--.

COLUMN 16

Line 1, "quality if" should read --quality is--; and
   Line 4, "reasonably" should read --reasonable--.

COLUMN 20

Line 3, "shows" should read --show--.

COLUMN 21

Line 32, "applies" should read --apply--.

COLUMN 22

Line 18, "(ie" should read --(i.e.--.

COLUMN 25

Line 29, "servers" should read --serves--.

UNITED STATES PATENT AND TRADEMARK OFFICE
CERTIFICATE OF CORRECTION

PATENT NO.       : 7,110,608 B2
APPLICATION NO.  : 10/184938
DATED            : September 19, 2006
INVENTOR(S)      : Woei Chan et al.

It is certified that error appears in the above-identified patent and that said Letters Patent is hereby corrected as shown below:

<u>COLUMN 27</u>

Line 12, "will" should be deleted; and
Line 50, "FIG. 14" should read --FIG. 14.--.

<u>COLUMN 28</u>

Line 8, "implementation"" should read --implementation."--; and
Line 30, "readers" should read --readers.--.

<u>COLUMN 31</u>

Line 54, "step 1860" should read --step 18060--.

<u>COLUMN 32</u>

Line 48, "the a file" should read --a file--.

<u>COLUMN 34</u>

Line 12, "(ie" should read --(i.e.--.

<u>COLUMN 35</u>

Line 4, "IBM-PC's" should read --IBM-PCs--; and
Line 38, "industries)." should read --industries.--.

<u>COLUMN 36</u>

Line 30, "sub passes" should read --sub-passes--.

<u>COLUMN 37</u>

Line 37, "sub passes;" should read --sub-passes;--.

<u>COLUMN 38</u>

Line 46, "comprising;" should read --comprising:--.

UNITED STATES PATENT AND TRADEMARK OFFICE
CERTIFICATE OF CORRECTION

PATENT NO.        : 7,110,608 B2
APPLICATION NO.   : 10/184938
DATED             : September 19, 2006
INVENTOR(S)       : Woei Chan et al.

It is certified that error appears in the above-identified patent and that said Letters Patent is hereby corrected as shown below:

COLUMN 39

Line 22, "codestream:" should read --codestream;--;
    Line 58, "code stream" should read --codestream--; and
    Line 65, "code stream" should read --codestream--.

COLUMN 40

Line 14, "subpasses" should read --sub-passes--;
    Line 27, "codestream:" should read --codestream;--; and
    Line 57, "sub passes." should read --sub-passes.--.

COLUMN 41

Line 18, "codestream:" should read --codestream;--.

COLUMN 42

Line 10, "DINT" should read --DWT--;
    Line 13, "sub passes" should read --sub-passes--;
    Line 26, "code" should read --code- --;
    Line 27, "stream:" should read --stream;--; and
    Line 32, "code stream" should read --codestream--.

Signed and Sealed this

Thirtieth Day of December, 2008

JON W. DUDAS
*Director of the United States Patent and Trademark Office*